(12) United States Patent
Mohammed et al.

(10) Patent No.: US 11,814,559 B2
(45) Date of Patent: Nov. 14, 2023

(54) SCINTILLATION MATERIALS

(71) Applicant: King Abdullah University of Science and Technology, Thuwal (SA)

(72) Inventors: Omar F. Mohammed, Thuwal (SA); Osman M. Bakr, Thuwal (SA); Yuhai Zhang, Thuwal (SA)

(73) Assignee: King Abdullah University of Science and Technology, Thuwal (SA)

( * ) Notice: Subject to any disclaimer, the term of this patent is extended or adjusted under 35 U.S.C. 154(b) by 440 days.

(21) Appl. No.: 16/596,664

(22) Filed: Oct. 8, 2019

(65) Prior Publication Data

US 2020/0255724 A1 Aug. 13, 2020

Related U.S. Application Data

(60) Provisional application No. 62/848,128, filed on May 15, 2019, provisional application No. 62/802,298, filed on Feb. 7, 2019.

(51) Int. Cl.
*G01T 1/20* (2006.01)
*C09K 11/02* (2006.01)
*C09K 11/66* (2006.01)
*C01G 21/00* (2006.01)
*G01T 1/202* (2006.01)
(Continued)

(52) U.S. Cl.
CPC .......... *C09K 11/025* (2013.01); *C01G 21/006* (2013.01); *C09K 11/665* (2013.01); *G01T 1/20* (2013.01); *G01T 1/2023* (2013.01); *B82Y 15/00* (2013.01); *B82Y 20/00* (2013.01); *B82Y 40/00* (2013.01); *C01P 2002/34* (2013.01); *C01P 2002/72* (2013.01); *C01P 2002/74* (2013.01); *C01P 2004/03* (2013.01);
(Continued)

(58) Field of Classification Search
CPC .. C09K 11/025; C09K 11/665; C01G 21/006; G01T 1/20; G01T 1/2023; B82Y 15/00; B82Y 20/00; B82Y 40/00; C01P 2002/34; C01P 2002/72; C01P 2002/74; C01P 2004/03; C01P 2004/04; C01P 2004/24; C01P 2006/60; C01P 2002/84
See application file for complete search history.

(56) References Cited

U.S. PATENT DOCUMENTS

2004/0129922 A1 7/2004 Shibuya et al.
2017/0160405 A1* 6/2017 Kim ........................ G01T 1/201

FOREIGN PATENT DOCUMENTS

JP 2003113372 A 4/2003
JP 2003149345 A 5/2003
(Continued)

OTHER PUBLICATIONS

Klein et al., "Insights into the formation mechanism of two-dimensional lead halide nanostructures," Nanoscales, Issue 9, 25 pages. (Year: 2018).*

(Continued)

*Primary Examiner* — Kiho Kim
(74) *Attorney, Agent, or Firm* — Billion & Armitage

(57) ABSTRACT

Embodiments of the present disclosure generally describe scintillation materials, including colloidal scintillation materials and solid scintillation materials, methods of preparing the scintillation materials, applications of the scintillation materials, methods of using the scintillation materials, and the like.

18 Claims, 13 Drawing Sheets

(51) Int. Cl.
*B82Y 15/00* (2011.01)
*B82Y 40/00* (2011.01)
*B82Y 20/00* (2011.01)

(52) U.S. Cl.
CPC ...... *C01P 2004/04* (2013.01); *C01P 2004/24* (2013.01); *C01P 2006/60* (2013.01)

(56) References Cited

FOREIGN PATENT DOCUMENTS

| JP | 2011046789 A | 3/2011 |
|---|---|---|
| JP | 2018522959 A | 8/2018 |
| WO | 2017211603 A1 | 12/2017 |
| WO | 2018021975 A1 | 2/2018 |

OTHER PUBLICATIONS

Aberle, et al., "Large Scale Gd-Beta-Diketonate Based Organic Liquid Scintillator Production for Antineutrino Detection", Journal of Instrumentation, vol. 7, P06008, 2012, 15 pages.
Akkerman, et al., "Solution Synthesis Approach to Colloidal Cesium Lead Halide Perovskite Nanoplatelets with Monolayer-Level Thickness Control", Journal of the American Chemical Society, vol. 138, 2016, 7 pages.
Brennan, "Origin of the Size-Dependent Stokes Shift in CsPbBr3 Perovskite Nanocrystals", Journal of the American Chemical Society, vol. 139, Aug. 3, 2017, 8 pages.
Chen, et al., "All-Inorganic Perovskite Nanocrystal Scintillators", Nature, vol. 561, Sep. 6, 2018, pp. 88-93.
De Weerd, et al., "Energy Transfer between Inorganic Perovskite Nanocrystals", The Journal of Physical Chemistry C, vol. 120, May 26, 2016, pp. 13310-13315.
Glodo, et al., "New Developments in Scintillators for Security Applications", Physics Procedia, vol. 90, 2017, pp. 285-290.
Jagielski, et al., "Aggregation-Induced Emission in Lamellar Solids of Colloidal Perovskite Quantum Wells", Science Advances, vol. 3, eaaq0208, Dec. 22, 2017, pp. 1-10.
Kanai, et al., "Hot-Pressing Method to Consolidate Gd3(Al, Ga)5O12: Ce Garnet Scintillator Powder for Use in an X-Ray CT Detector", International Journal of Applied Ceramic Technology, vol. 10, 2012, pp. 1-10.
Kim, et al., "Efficient Luminescence from Perovskite Quantum Dot Solids", ACS Applied Materials & Interfaces, vol. 7, 2015, 7 pages.
Kim, et al., "Printable Organometallic Perovskite Enables Large-Area, Low-Dose X-Ray Imaging", Nature, vol. 550, Oct. 5, 2017, pp. 87-91.
Knoll, "Radiation Detection and Measurement", John Wiley & Sons, Inc., 2010, 796 pages.
Kovalenko, et al., "Properties and Potential Optoelectronic Applications of Lead Halide Perovskite Nanocrystals", Science, vol. 358, Nov. 10, 2017, pp. 745-750.
Lauck, et al., "Low-Afterglow, High-Refractive-Index Liquid Scintillators for Fast-Neutron Spectrometry and Imaging Applications", IEEE Transactions on Nuclear Science, vol. 56, No. 3, Jun. 2009, pp. 989-993.
Lecoq, "Development of New Scintillators for Medical Applications", Nuclear Instruments and Methods in Physics Research A, vol. 809, 2016, pp. 130-139.
Lindhoud, et al., "Rise-Time of FRET-Acceptor Fluorescence Tracks Protein Folding", International Journal of Molecular Sciences, vol. 15, Dec. 19, 2014, pp. 23836-23850.
Liu, et al., "Effect of Mg2+ Co-Doping on the Scintillation Performance of LuAG: Ce Ceramics", Physica Status Solidi—Rapid Research Letters, vol. 8, No. 1, 2014, pp. 105-109.
Liu, et al., "Facile Single-Precursor Synthesis and Surface Modification of Hafnium Oxide Nanoparticles for Nanocomposite γ-Ray Scintillators", Advanced Functional Materials, vol. 25, 2015, pp. 4607-4616.
Liu, et al., "Transparent Ultra-High-Loading Quantum Dot/Polymer Nanocomposite Monolith for Gamma Scintillation", ACS Nano, vol. 11, May 28, 2017, pp. 6422-6430.
Nikl, et al., "Recent R&D Trends in Inorganic Single-Crystal Scintillator Materials for Radiation Detection", Advanced Optical Materials, vol. 3, 2015, pp. 1-19.
Pereira, et al., "Characteristics of the CsI:TI Scintillator Crystal for X-Ray Imaging Applications", Materials Sciences and Applications, vol. 9, 2018, pp. 268-280.
Raino, et al., "Superfluorescence from Lead Halide Perovskite Quantum Dot Superlattices", Nature, vol. 563, Nov. 29, 2018, pp. 671-675.
Shamsi, et al., "Bright-Emitting Perovskite Films by Large-Scale Synthesis and Photo-Induced Solid-State Transformation of CsPbBr3 Nanoplatelets", ACS Nano, vol. 11, Sep. 25, 2017, pp. 10206-10213.
Song, et al., "Quantum Dot Light-Emitting Diodes Based on Inorganic Perovskite Cesium Lead Halides (CsPbX3)", Advanced Materials. vol. 27, 2015, pp. 7162-7167.
Stasio, et al., "Near-Unity Photoluminescence Quantum Yield in CsPbBr3 Nanocrystal Solid-State Films via Postsynthesis Treatment with Lead Bromide", Chemistry of Materials, vol. 29, Sep. 12, 2017, pp. 7663-7667.
Takeoka, et al., "Systematic Studies on Chain Lengths, Halide Species, and Well Thicknesses for Lead Halide Layered Perovskite Thin Films", Bulletin of the Chemical Society of Japan, vol. 79, No. 10, Oct. 10, 2006, pp. 1607-1613.
Wang, et al., "CsPbBr3 Perovskite Quantum Dots-Based Monolithic Electrospun Fiber Membrane as an Ultrastable and Ultrasensitive Fluorescent Sensor in Aqueous Medium", Journal of Physical Chemistry Letters, vol. 7, 2016, pp. 4253-4258.
Weber, "Inorganic Scintillators: Today and Tomorrow", Journal of Luminescence, vol. 100, 2002, pp. 35-45.
Wei, et al., "Monolithic Integration of Hybrid Perovskite Single Crystals With Heterogenous Substrate for Highly Sensitive X-Ray Imaging", Nature Photonics, vol. 11, Apr. 17, 2017, pp. 1-7.
Wei, et al., "Sensitive X-Ray Detectors Made of Methylammonium Lead Tribromide Perovskite Single Crystals", Nature Photonics, vol. 10, May 2016, pp. 333-339.
Wurm, et al., "The Next-Generation Liquid-Scintillator Neutrino Observatory LENA", Astroparticle Physics, vol. 35, 2012, pp. 685-732.
Yakunin, et al., "Detection of Gamma Photons Using Solution-Grown Single Crystals of Hybrid Lead Halide Perovskites", Nature Photonics, vol. 10, Jul. 25, 2016, pp. 1-5.
Yakunin, et al., "Detection of X-Ray Photons by Solution-Processed Organic-Inorganic Perovskites", Nature Photonics, vol. 9, 2015, pp. 444-449.
Zhang, et al., "Zero-Dimensional Cs4PbBr6 Perovskite Nanocrystals", Journal of Physical Chemistry Letters, vol. 8, Feb. 9, 2017, pp. 961-965.
Kobayashi, et al., "Scintillation characteristics of CsPbCl3 single crystals", Nuclear Instruments and Methods in Physics Research A, NL, Elsevier, Mar. 10, 2008 vol. 592, Mar. 10, 2008, pp. 369-373.
Chang, Yia-Chung , "Phonon dispersion and polar-optical scattering in 2H Pbl 2", Apr. 1, 1997, vol. 55, No. 13; 7 pages.
Lund, J . C . , "Lead Iodide Crystals and Detectors", Semiconductors and Semimetals. vol . 43, Chapter 11 vol 43; pp. 443-464.

\* cited by examiner

FIG. 4B  FIG. 4C

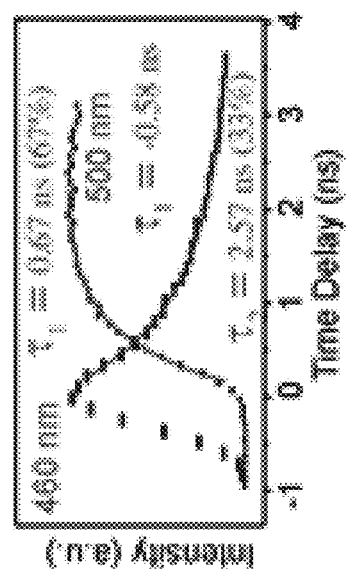
FIG. 7A
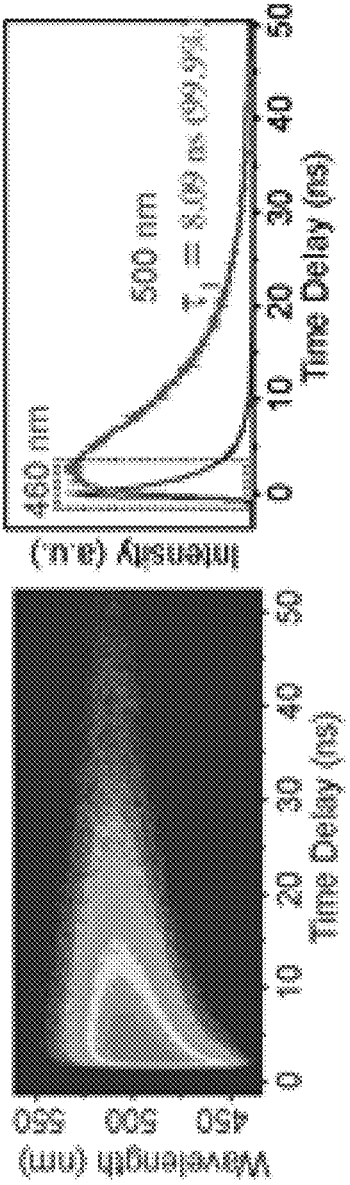
FIG. 7B
FIG. 7C
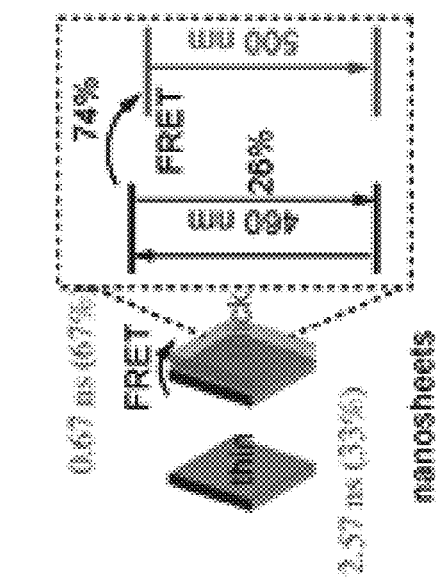
FIG. 7D
FIG. 7E
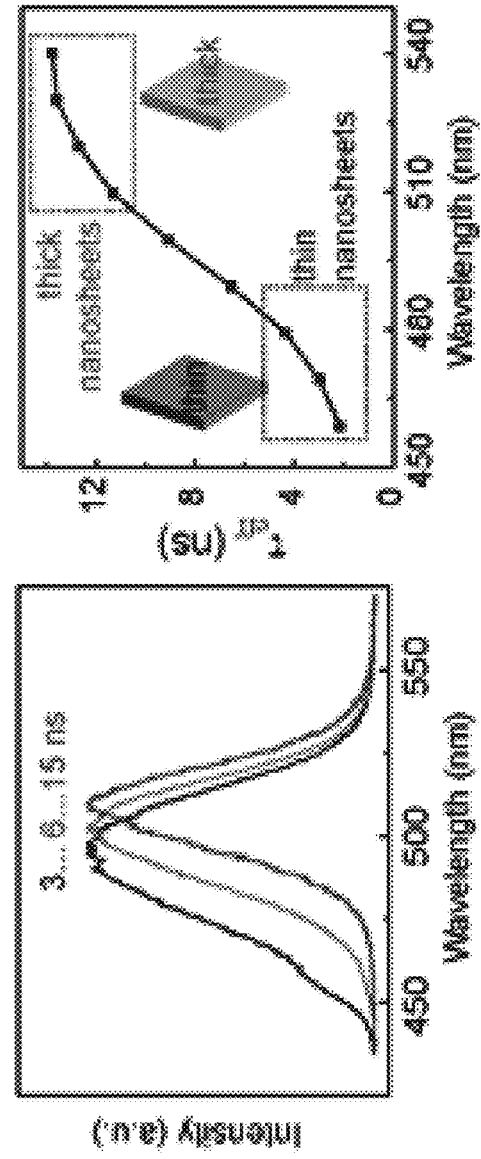
FIG. 7F

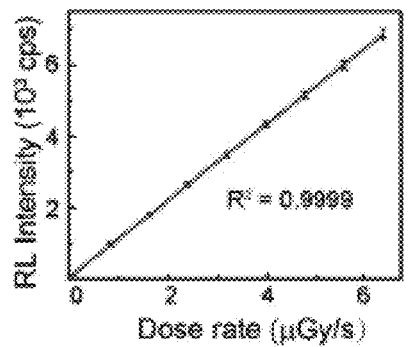
FIG. 9A
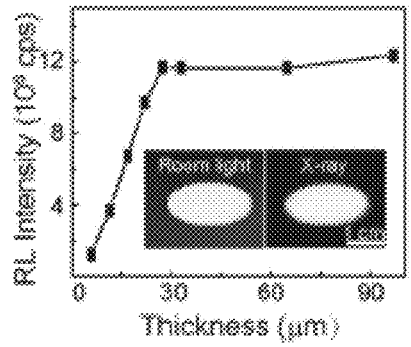
FIG. 9B
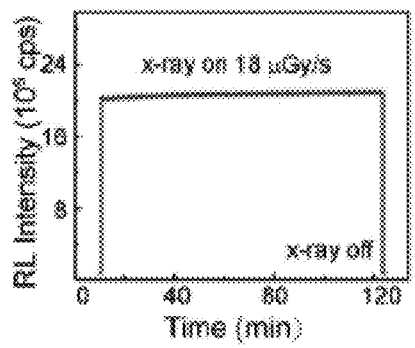
FIG. 9C
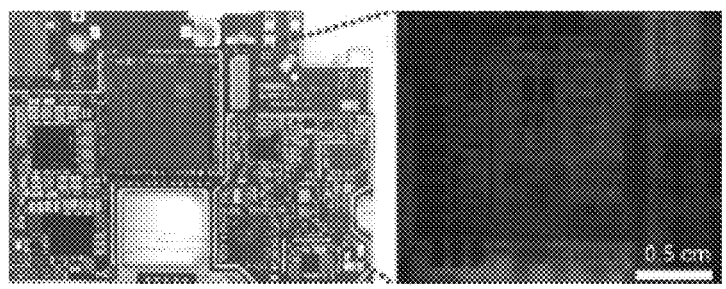
FIG. 9D FIG. 9E FIG. 9F
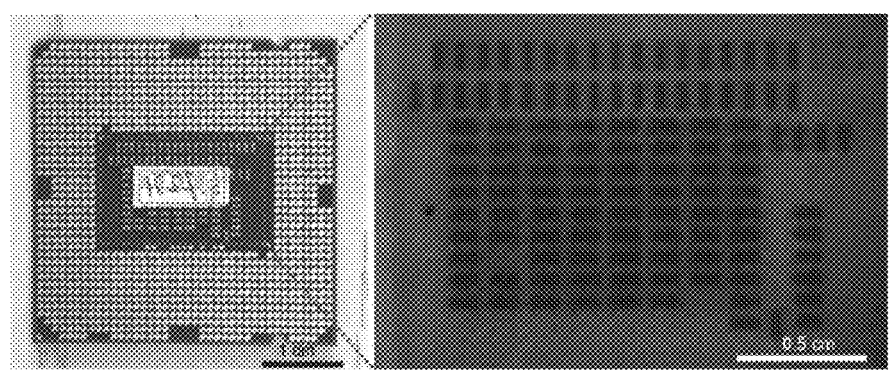
FIG. 9G FIG. 9H

SCINTILLATION MATERIALS

BACKGROUND

Scintillators, which are capable of converting ionizing radiation into visible photons, are an integral part of medical, security, and commercial diagnostics technologies such as X-ray imaging, nuclear cameras, and computed tomography. Conventional scintillator fabrication typically involves high-temperature sintering, generating agglomerated powders or large bulk crystals, which pose a major challenge for device integration and processability. On the other hand, colloidal quantum dot scintillators cannot be cast into compact solid films with the necessary thickness required for most X-ray applications.

Scintillating materials are widely used for radiation-detection applications in many fields, including interstellar particle detection, X-ray security, nuclear cameras, and computed tomography, due to their ability to convert ionizing radiation into visible or ultraviolet photons. Conventional scintillators, such as CsI(Tl) crystals and cerium-activated glass, are usually synthesized under high-temperature conditions, which is neither cost-effective nor user-friendly. Additionally, the resulting powder scintillator suffers from severe agglomeration while a precisely sliced single crystal is required to be easily incorporated into device architectures.

An ideal scintillator with a controllable thickness should be solution-processable. Organic dye solutions, such as p-terphenyl ($C_{18}H_{14}$), PBD ($C_{20}H_{14}N_2O$), and PPO ($C_{15}H_{11}NO$), have been used as scintillators to detect neutrons. However, the detection efficiency is severely low due to their low stopping power because of their low atomic number constituents. Moreover, organic dyes are intrinsically susceptible to both the photobleaching effect and oxygen quenching, hindering their practical application in many areas. All-inorganic perovskite nanocrystals with heavy-atom elements, such as Cs, Pb, and Br, have recently emerged as efficient scintillator materials due to their high stopping power, low detection limit, and multicolor radioluminescence. However, these nanocrystals are difficult to cast into compact solid form films with the requisite thickness (due to the long penetration depth of X-rays) and areas sizes for commercially viable applications. Thus, only small device areas were possible to investigate.

SUMMARY

Embodiments of the present disclosure describe scintillation materials, including colloidal scintillation materials and solid scintillation materials, methods of preparing the scintillation materials, applications of the scintillation materials, methods of using the scintillation materials, and the like.

Embodiments of the present disclosure describe scintillation materials comprising halide perovskite nanosheets and optionally one or more ligands bound or tethered to the halide perovskite nanosheets. In some embodiments, the halide perovskite nanosheets have the formula $AMX_3$, where A is an inorganic cation or organic cation, M is a metal cation, and X is a halide.

In some embodiments, the scintillation materials are colloidal scintillation materials comprising a plurality of halide perovskite nanosheets dispersed in a liquid medium. In some embodiments, the concentration of halide perovskite nanosheets dispersed in the liquid medium is about 150 mg/mL. In some embodiments, the colloidal scintillation materials described herein achieve light yields that are about 1.5 times the light yields of conventional scintillation materials. In some embodiments, the colloidal scintillation materials exhibit light yields in the range of about 21,000 photons/MeV or greater. In some embodiments, the colloidal scintillation materials exhibit high stability under storage conditions and continuous (or intermittent) X-ray exposure. In some embodiments, the colloidal scintillation materials are characterized by a non-uniform nanosheet thickness. In some embodiments, the colloidal scintillation materials are solution-processable at about room temperatures and used to form large-area thin film scintillation materials.

In some embodiments, the scintillation materials are solid scintillation materials comprising a halide perovskite superstructure, wherein the halide perovskite superstructure comprises stacked layers of halide perovskite nanosheets. In some embodiments, the solid scintillation materials comprise halide perovskite nanosheets characterized as having a non-uniform distribution of nanosheet thicknesses. In some embodiments, the solid scintillation materials are wavelength emission tunable. In some embodiments, the solid scintillation materials have a tunable film thickness. In some embodiments, the solid scintillation materials are crack- and/or defect-free large-area thin films.

Embodiments of the present disclosure also describe X-ray detection systems comprising a scintillation material for absorbing X-rays and emitting visible photons, wherein the scintillation material is deposited on a substrate as a thin film halide perovskite superstructure; and a detection device for absorbing the visible photons emitted by the scintillation material. In some embodiments, the halide perovskite superstructure comprises thin and thick halide perovskite nanosheets. In some embodiments, an energy transfer between the thin and thick halide perovskite nanosheets within the stacked layers of halide perovskite nanosheets increases an efficiency and sensitivity of the scintillation material for X-ray detection.

Embodiments of the present disclosure also describe methods of detecting X-rays comprising irradiating a scintillation material with X-rays or X-ray radiation, wherein the solid scintillation material absorbs incident X-rays and emits visible photons; and detecting the visible photons emitted from the solid scintillation material.

Embodiments of the present disclosure also describe methods of preparing scintillation materials comprising one or more of the following steps: dissolving a first precursor in a mixture comprising solvent A and solvent B to form a first reaction mixture; dissolving an excess of a second precursor in a mixture comprising a solvent C and one or more ligands to form a second reaction mixture; contacting second reaction mixture with the first reaction mixture to form halide perovskite nanosheets; separating the halide perovskite nanosheets from the first reaction mixture and the second reaction mixture; dispersing the halide perovskite nanosheets in a liquid medium to form a colloidal scintillation material; and depositing the colloidal scintillation material on a substrate to form a solid scintillation material.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which:

FIGS. 4A-4F show: a) Schematic showing the self-assembly process of $CsPbBr_3$ nanosheets. The bottom panel shows the photographs of a heavily loaded colloid (150 mg/mL) in toluene and a wafer-sized thin film on a glass slide. b) TEM image of the assembled $CsPbBr_3$ nanoplatelets, featuring an interplane spacing of 2.1 nm. c) HRTEM image of the assembly, showing a clear lattice fringe of (200) facets. d) Low-angle XRD diffraction pattern of the assembled $CsPbBr_3$ thin film, showing a series of interplane diffraction peaks of the stacked $CsPbBr_3$ nanoplatelets. The peak spacing of 3.82° suggests an interplane spacing of 2.32 nm, in line with the TEM results. e) SEM image showing the flatness of the thin film. f) Steady-state absorption and photoluminescence spectra of the colloid and thin-film samples, according to one or more embodiments of the present disclosure.

$$\tau = \frac{K\lambda}{\beta\cos\theta}$$

Where τ is the mean thickness of the $CsPbBr_3$ nanosheet; K is Scherrer constant with a typical value of 0.89; λ is the X-ray wavelength about 0.154 nm; β is the line broadening (full width at half maximum, or FWHM) in radians; θ is the Bragg angle. The characteristic peak of (110) facet was fitted with Gaussian function and FWHM is found to be 2.71° (0.047 in radians). Therefore, the mean thickness is around 2.95 nm which is in good agreement with the HRTEM result.

Figure 6B:
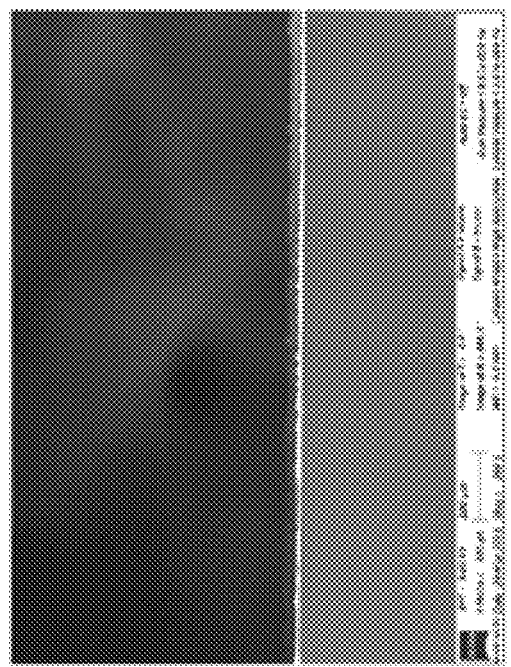
Figure 6A:
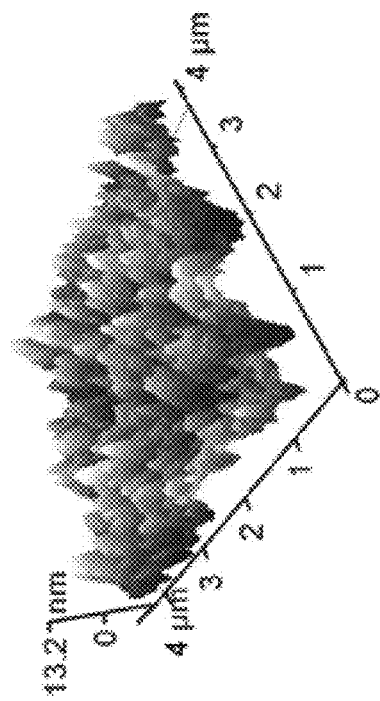

FIGS. 6A-6B shows: a) Cross section of crack-free thin film of $CsPbBr_3$ nanosheets, showing a homogeneous thickness of 4 μm. b) AFM image of thin-film surface, according to one or more embodiments of the present disclosure.

FIGS. 7A-7F shows streak camera measurement of transient PL from the thin film of the $CsPbBr_3$ nanosheet assembly (Pb/Cs: 5/1): a) 2D pseudocolor transient emission map, excitation at 410 nm, flux at 1 pJ/cm². b) Transient PL profiles at 3 ns, 6 ns, and 15 ns, showing the recombination center shifting of excitons. PL decay traces extracted at 460 and 500-nm windows (±5 nm). c) Magnified image of PL decay traces in the first 3 ns, where the building-up lifetime of 500-nm emission is comparable to the short component of 460-nm emission, indicating an efficient energy transfer. The dashed box highlighted the building-up stage of 500-nm emission. d) The effective lifetime was plotted against the wavelength, with two plateau lifetimes (dashed box) ascribable to thin and thick nanosheets, respectively. e) Magnified image of PL decay traces in the first 3 ns, where the building-up lifetime of 500-nm emission is comparable to the short component of 460-nm emission, indicating an efficient energy transfer. f) Schematic showing the energy transfer process from thin to thick nanosheets, with a FRET efficiency of 74%, according to one or more embodiments of the present disclosure.

FIGS. 8A-8F shows radioluminescence of the colloidal and solid forms of $CsPbBr_3$ nanosheets: (a) Photographs of the concentrated colloid (0.15 g/mL) under ambient light and an X-ray. The exposure time for the RL photo was set to 2 s. (b) Pulse height spectra of a standard commercial scintillator (Ce:LuAG) and a $CsPbBr_3$ colloid. Note that the Compton edge for the colloidal scintillator is significantly weak. The RL spectra (c), peak (d), and intensity (e) were monitored during the transformation from a colloid to a solid in 12 min. (f) Small-angle XRD shows the emergence of the superstructure during the drying process of the colloid, according to one or more embodiments of the present disclosure.

FIGS. 9A-9H shows radiography property of the perovskite thin film comprising $CsPbBr_3$ nanosheets: (a) The dose-dependence of the RL intensity shows a linear relationship. (b) The thickness dependence of the RL intensity suggests an optimal value at 25 μm, above which the added thickness is not able to gain more RL intensity. The inset shows the RL photograph of a 25 μm-thick film. (c) Intensity record of the thin-film RL over 2-hour exposure of X-ray radiation at 18 μGy/s, showing a robust stability. (d) Photograph of a transistor panel in a cellphone. (e) The interior structure of the resin-covered panel (red dashed square) can be clearly revealed by the perovskite thin-film screen under our homemade radiography setup. (f) The point spread function (red line) of the intensity profile is fitted with a Gaussian function (blue line), and the full width at half-maximum (FWHM) is taken as the resolution. (g) Photograph of a standard CPU panel with a silicon chip integrated underneath. (h) X-ray imaging of the covered part (red dashed square) by the silicon chip, showing an unharmed resolution, according to one or more embodiments of the present disclosure.

Figure 10:
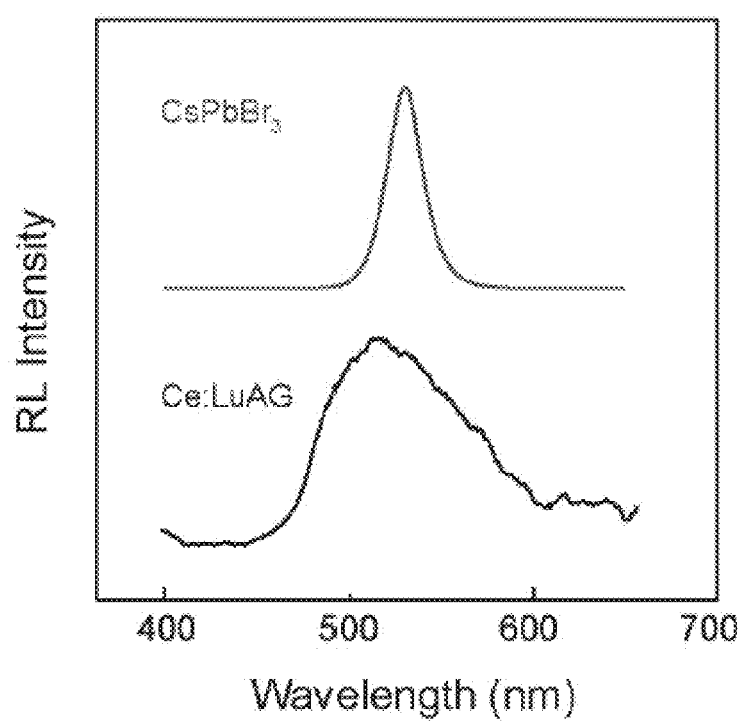

FIG. 10 shows RL spectra of $CsPbBr_3$ colloidal and Ce:LuAG single crystal, respectively, according to one or more embodiments of the present disclosure. The samples were excited by γ rays with energy of 662 keV ($^{137}Cs$ source).

Figure 11:
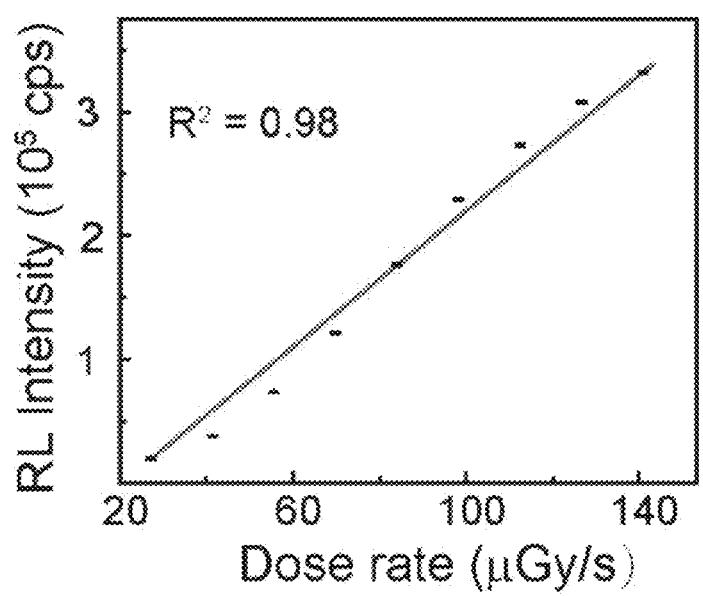

FIG. 11 dose-dependence of RL intensity of CsPbBr3 thin film, showing a quasi-linearity, according to one or more embodiments of the present disclosure.

Figure 12:
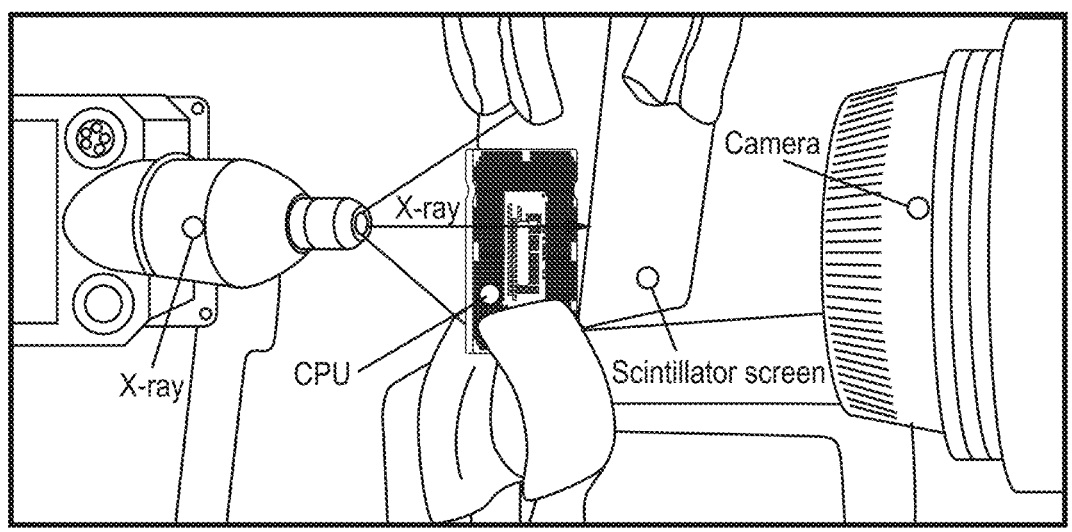

FIG. 12 is a projection configuration of home-made prototype X-ray imager, according to one or more embodiments of the present disclosure.

Figure 13:
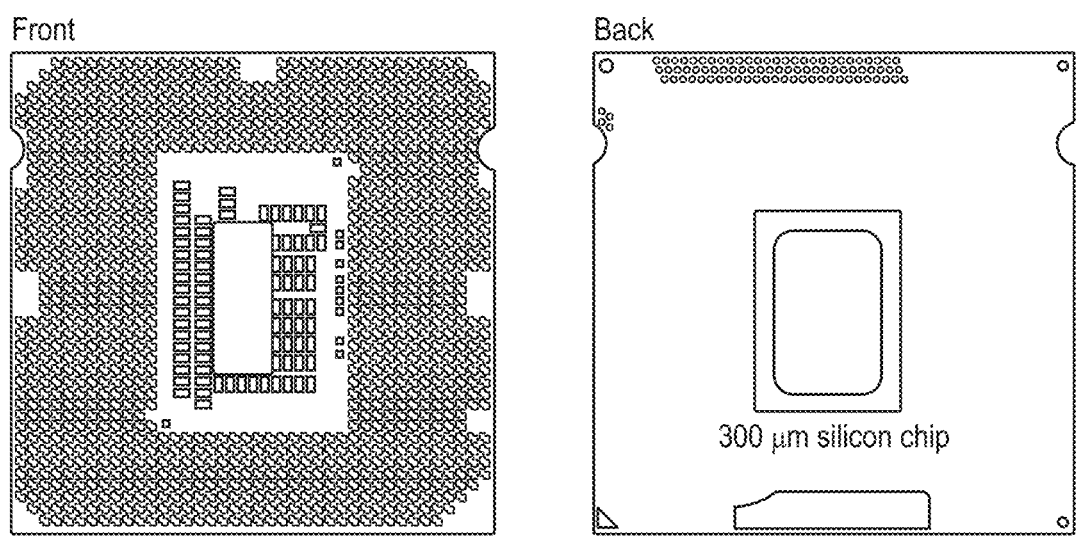

FIG. 13 is a photograph of CPU panel with a 300-μm silicon chip underneath, according to one or more embodiments of the present disclosure.

DETAILED DESCRIPTION

The present disclosure relates to novel scintillation materials based on halide perovskite nanosheets. The scintillation materials can be prepared in highly concentrated colloidal forms in which halide perovskite nanosheets are dispersed in a liquid medium. The colloidal forms of the scintillation materials can exhibit light yields 1.2× greater than the light yields of conventional and commercially available scintillation materials. In addition, the colloidal scintillation materials display strong radioluminescence and high stability under continuous (or intermittent) X-ray exposure.

Due to the materials' high concentrations and nanosheet morphology, the colloidal scintillation materials are readily solution-processable and can be easily cast to form uniform crack-free large-area films with thicknesses suitable for high resolution X-ray imaging applications. In forming the solid scintillation materials, the halide perovskite nanosheets can assemble into stacked halide perovskite nanosheets to form halide perovskite superstructures. Halide perovskite superstructures based on stacked layers of halide perovskite nanosheets is unprecedented. In addition, the solid scintillation materials are characterized in that the halide perovskite nanosheets have a broad distribution of thicknesses, with a multitude of thin and thick nanosheets in a stacked configuration. The stacked configuration of thin and thick nanosheets affords solid scintillation materials with enhanced efficiency and sensitivity for X-ray detection. While not wishing to be bound to a theory, it is believed that the enhanced efficiency and sensitivity is driven by a novel energy transfer process between the thin and thick sheets. This energy transfer process surprisingly increases the light intensity of the scintillation materials.

Definitions

The terms recited below have been defined as described below. All other terms and phrases in this disclosure shall be construed according to their ordinary meaning as understood by one of skill in the art.

As used herein, the term "halide perovskite" refers to compounds of the formula: $AMX_3$, wherein: A is an inorganic cation or organic cation, M is a metal cation, and X is a halide. In some embodiments, the inorganic cation or organic cation (A) is selected from cesium (Cs), rubidium (Rb), methylammonium (MA), formamidinium (FA), and 5-annomiumvaleric acid. In some embodiments, the metal cation (M) is selected from Pb, Sn, Cu, Ni, Co, Fe, Mn, Pd, Cd, Ge, and Eu. In some embodiments, the halide (X) is selected from Cl, Br, and I. In some embodiments, the halide perovskite compound is selected from $MAPbI_3$, $MAPbBr_3$, $MAPbCl_3$, $FAPbBr_3$, $FAPbI_3$, $FAPbCl_3$, $CsPbI_3$, $CsPbCl_3$, $CsPbBr_3$, $FASnI_3$, $FASnBr_3$, $FASnCl_3$, $MASnI_3$, $MASnBr_3$, and $MASnCl_3$.

As used herein, the term "colloid" or "colloidal" generally refers to a material in which particles are dispersed and/or suspended in a liquid medium. For example, "colloid" can refer to colloidal dispersions and/or colloidal suspensions. It can also refer to homogeneous mixtures and/or heterogeneous mixtures.

As used herein, the term "solid" generally refers to a material in a solid state or quasi-solid state. The term "solid" includes forms such as films (e.g., thin films), coatings, and layers, among others.

As used herein, the term "non-uniform distribution of nanosheet thicknesses," "broad distribution of nanosheet thicknesses," and/or "inhomogeneous distribution of nanosheet thicknesses" refers to nanosheets characterized by a plurality of thicknesses. For example, in some embodiments, the term "non-uniform distribution of nanosheet thicknesses," and like terms, can be used to describe nanosheets characterized by two or more thicknesses, nanosheets characterized in that none of the nanosheets have the same thickness (e.g., all of the nanosheets have different thicknesses), and/or nanosheets characterized by any variation between nanosheets having two or more thicknesses and nanosheets in which none of them have the same thicknesses.

Scintillation Materials

Embodiments of the present disclosure describe scintillation materials comprising (or consisting of) halide perovskite nanosheets and optionally one or more ligands. As described in greater detail below, in some embodiments, the scintillation materials are provided in colloidal form. In other embodiments, the scintillation materials are provided in solid form.

In general, the halide perovskite nanosheets can be characterized by the formula: $AMX_3$, where A is an inorganic cation or organic cation, M is a metal cation, and X is a halide. In some embodiments, the inorganic or organic cation (A) is selected from cesium (Cs), rubidium (Rb), methylammonium (MA), formamidinium (FA), and 5-annomiumvaleric acid. In some embodiments, the metal cation (M) is selected from Pb, Sn, Cu, Ni, Co, Fe, Mn, Pd, Cd, Ge, and Eu. In some embodiments, the halide (X) is selected from Cl, Br, and I. Examples of halide perovskite nanosheets characterized by the formula $AMX_3$ include, but are not limited to, $MAPbI_3$, $MAPbBr_3$, $MAPbCl_3$, $FAPbBr_3$, $FAPbI_3$, $FAPbCl_3$, $CsPbI_3$, $CsPbCl_3$, $CsPbBr_3$, $FASnI_3$, $FASnBr_3$, $FASnCl_3$, $MASnI_3$, $MASnBr_3$, and $MASnCl_3$.

In certain embodiments, the scintillation materials comprise (or consist of) halide perovskite nanosheets of the formula: $CsPbX_3$, where X is selected from Cl, Br, and I. For example, in some embodiments, the scintillation materials comprise halide perovskite nanosheets of the formula $CsPbCl_3$. In some embodiments, the scintillation materials comprise halide perovskite nanosheets of the formula $CsPbBr_3$. In some embodiments, the scintillation materials comprise halide perovskite nanosheets of the formula $CsPbI_3$. In certain embodiments, the scintillation materials comprise all-inorganic perovskite nanocrystal scintillators as described in Chen, Q., et al., All-inorganic perovskite nanocrystal scintillators. Nature 2018, 561(7721), 88, which is hereby incorporated by reference in its entirety.

In some embodiments, the scintillation materials further comprise one or more ligands. In general, the ligands are not particularly limited and can include any ligands suitable for the halide perovskite nanosheets of the present disclosure. In some embodiments, the one or more ligands are selected so that the ligands are bound or tethered to one or more of the halide perovskite nanosheets. In some embodiments, the one or more ligands are selected from carboxylic acids, amines, carboxylates, phosphines, phosphine oxides, thiols, sulfates, sulfonates, phosphates, and combinations thereof. For example, in some embodiments, the one or more ligands are selected from octylamine, octanoic acid, oleic acid, oleylamine, octadecene, octylphosphonic acid, trioctylphosphine, trioctylphosphine oxide, and combinations thereof. In certain embodiments, the ligands are octylamine and octanoic acid.

Having discussed the scintillation materials of the present disclosure in general, various forms of the scintillation materials of the present disclosure are now presented.

Colloidal Scintillation Materials

Embodiments of the present disclosure also describe colloidal forms of the scintillation materials. For example, in some embodiments, the scintillation materials comprise a plurality of halide perovskite nanosheets dispersed in a liquid medium. In some embodiments, the scintillation materials further comprise one or more ligands, wherein the one or more ligands bound or tethered to the halide perovskite nanosheets. For example, in some embodiments, the scintillation materials comprise a plurality of halide perovskite nanosheets, and one or more ligands tethered or bound to the halide perovskite nanosheets, dispersed in a liquid medium.

The concentration of halide perovskite nanosheets in the liquid medium can be in the range of about 0.01 mg/mL to about 200 mg/mL. In some embodiments, the scintillation material is characterized as having a high concentration of halide perovskite nanosheets that are dispersed in the liquid medium. For example, in some embodiments, the concentration of halide perovskite nanosheets is about 200 mg/mL or less. In some embodiments, the concentration of halide perovskite nanosheets is about 170 mg/mL. In some embodiments, the concentration of halide perovskite nanosheets is about 160 mg/mL. In some embodiments, the concentration of halide perovskite nanosheets is about 150 mg/mL. In some embodiments, the concentration of halide perovskite nanosheets is about 140 mg/mL. In some embodiments, the concentration of halide perovskite nanosheets is about 130 mg/mL. In some embodiments, the concentration of halide perovskite nanosheets is about 120 mg/mL. In some embodiments, the concentration of halide perovskite nanosheets is about 110 mg/mL. In some embodiments, the concentration of halide perovskite nanosheets is about 100 mg/mL.

The liquid medium can be selected from any liquid medium suitable for dispersing the halide-perovskite nanosheets. In some embodiments, the suitability of any given liquid medium depends on the polarity of the ligand. For example, in some embodiments, the liquid medium is selected from nonpolar solvents. In some embodiments, the liquid medium is selected form polar solvents. Examples of liquid mediums include, but are not limited to, one or more of toluene, dimethylsulfoxide (DMSO), N,N-dimethylformamide (DMF), gamma-butylolactone (GBR), dichloromethane (DCM), chloroform, acetonitrile, cyclohexane, hexane, and chloroform, among others. In some embodiments, a suitable liquid medium is a medium that reduces the occurrence of ligand detachment from the halide perovskite nanosheets. In some embodiments, ligand detachment leads to energy transfer to trap-states and increased self-absorption by other halide perovskite nanosheets in close proximity.

As described above, the colloidal scintillation materials of the present disclosure can surprisingly achieve higher light yields than conventional scintillation materials of any form. In some embodiments, the colloidal scintillation materials described herein achieve light yields that are about 1.5 times the light yields of conventional scintillation materials. For example, in some embodiments, the colloidal scintillation materials exhibit light yields in the range of about 21,000 photons/MeV or greater (whereas conventional scintillation materials only achieve light yields of about 18,000 photons/MeV). In other embodiments, the light yields of the colloidal scintillation materials is not particularly limited. For example, in some embodiments, the colloidal scintillation materials exhibit light yields of at least about 18,000 photons/MeV. In some embodiments, the light yields of the colloidal scintillation materials is less than about 18,000 photons/MeV and/or greater than about 18,000 photons/MeV.

Similarly, as described above, the colloidal scintillation materials exhibit excellent or high stability under storage conditions and continuous (or intermittent) X-ray exposure. For example, in some embodiments, the colloidal scintillation materials can be stored for about 1 month without any evidence of degradation. In some embodiments, the colloidal scintillation materials can be stored for durations longer than about 1 month without any evidence of degradation. In some embodiments, the colloidal scintillation materials can be exposed to continuous X-ray irradiation for durations of about 2 hours without any evidence of degradation or radio-degradation. In some embodiments, the colloidal scintillation materials can be exposed to continuous X-ray irradiation for durations longer than about 2 hours without any evidence of degradation or radio-degradation.

In some embodiments, the colloidal scintillation materials are characterized by a non-uniform nanosheet thickness. In some embodiments, the scintillation materials comprise halide perovskite nanosheets characterized as having a non-uniform distribution of nanosheet thicknesses. For example, in some embodiments, halide perovskite nanosheets having a non-uniform distribution of nanosheet thicknesses comprise a collection of thin halide perovskite nanosheets and thick halide perovskite nanosheets, wherein the thin halide perovskite nanosheets include nanosheets that are thin relative to the thick halide perovskite nanosheets.

Advantageously, the colloidal scintillation materials are solution-processable at about room temperatures and can be cast to form unprecedented large-area thin films. For example, in some embodiments, the colloidal scintillation materials are cast on a substrate, at about room temperature, to form a solid layer thereon, as a coating, film, or thin film. In some embodiments, the colloidal scintillation materials are cast on a substrate, at about room temperature, to form large-area thin films. In some embodiments, the large-area thin films are cast from highly concentrated solutions of halide perovskite nanocrystals. For example, in some embodiments, the large-area thin films are cast, at about room temperature, from solutions having a concentration of about 150 mg/mL of halide perovskite nanosheets. In some embodiments, said large-area thin films have a thickness suitable for most, if not all, X-ray applications.

The substrates are not particularly limited. In some embodiments, the substrates are transparent to light, such as visible light. Examples of substrates include, but are not limited to, glasses, plastics, ceramics, metals, crystalline semiconductors, and amorphous semiconductors, among others.

Solid Scintillation Materials

Embodiments of the present disclosure also describe solid forms of the scintillation materials. In general, the scintillation materials comprise a halide perovskite superstructure, wherein the halide perovskite superstructure comprises a plurality of halide perovskite nanosheets. In some embodiments, the scintillation materials comprise thin film scintillation materials. For example, in some embodiments, the scintillation materials comprise a thin film of a halide perovskite superstructure, wherein the halide perovskite superstructure comprises a plurality of halide perovskite nanosheets and optionally one or more ligands bound or tethered to the halide perovskite nanosheets.

In some embodiments, the halide perovskite superstructure comprises one or more stacks or stacked layers of halide perovskite nanosheets. For example, in some embodiments, the halide perovskite superstructure comprises a plurality of stacked halide perovskite nanosheets. In some embodiments, the halide perovskite superstructure comprises a single stack or stacked layer of halide perovskite nanosheets. In some embodiments, the halide perovskite superstructure comprises a plurality of halide perovskite nanosheets that have assembled or self-assembled (e.g., from the colloidal form of the scintillation materials) into the stacks or stacked layers of halide perovskite nanosheets. In some embodiments, the assembly or self-assembly of the halide perovskite nanosheets forms large-area thin films.

In some embodiments, the halide perovskite superstructure comprises one or more ligands. In some embodiments, the one or more ligands are bound or tethered to the halide perovskite nanosheets or monolayers thereof. In some embodiments, the one or more ligands are bound or tethered to the stacks or stacked layers of the halide perovskite nanosheets. In some embodiments, the one or more ligands are bound to the halide perovskite nanosheets in the areas between each halide perovskite nanosheet in a stack, or in the areas between each stack of halide perovskite nanosheets. In some embodiments, the one or more ligands form layers positioned alternately or randomly between each halide perovskite nanosheet or stack of halide perovskite nanosheets.

The stacked layers of halide perovskite nanosheets can have a variety of orientations relative to the surface of the thin film. For example, in some embodiments, the stacked layers of halide perovskite nanosheets are oriented parallel to the film surface, wherein a parallel orientation of the stacked layers of halide perovskite nanosheets is an orientation in which the halide perovskite nanosheets or layers thereof are stacked along an axis oriented parallel to the film surface. For example, in some embodiments, the edges of the nanosheets are more visible from a top view of the film surface than the planar surfaces of the nanosheets. In other embodiments, the stacked layers of halide perovskite nanosheets are oriented perpendicular to the film surface, wherein a perpendicular orientation of the stacked layers of halide perovskite nanosheets is an orientation in which the layers of halide perovskite nanosheets are stacked along an axis oriented perpendicular to the film surface. For example, in some embodiments, the planar surfaces of the nanosheets are more visible from a top view of the film surface than the edges of the nanosheets.

In some embodiments, the stacking is characterized by the manner in which the halide perovskite nanosheets are packed. For example, in some embodiments, the halide perovskite nanosheets are stacked with face-to-face packing. In some embodiments, the halide perovskite nanosheets are stacked with edge-to-edge packing. In some embodiments, the halide perovskite nanosheets are stacked with face-to-edge packing. In some embodiments, the halide perovskite nanosheets are stacked with one or more face-to-face packing, edge-to-edge packing, and face-to-edge packing.

In some embodiments, the scintillation materials comprise halide perovskite nanosheets characterized as having a non-uniform distribution of nanosheet thicknesses. For example, in some embodiments, halide perovskite nanosheets having a non-uniform distribution of nanosheet thicknesses comprise a collection of thin halide perovskite nanosheets and thick halide perovskite nanosheets, wherein the thin halide perovskite nanosheets include nanosheets that are thin relative to the thick halide perovskite nanosheets. In these embodiments, the energy transfer from the thin halide perovskite nanosheets to the thick halide perovskite nanosheets enhances the efficiency and/or sensitivity of the scintillation materials in X-ray detection applications.

In some embodiments, the scintillation materials comprise halide perovskite nanosheets with thicknesses in the range of about 1 nm to about 100 nm, or any increment thereof. For example, in some embodiments, the scintillation materials comprise halide perovskite nanosheets with thicknesses in the range of about 1 nm to about 5 nm, about 2 nm to about 4.5 nm, about 2.5 nm to about 4.5 nm, about 2.8 nm to about 4.2 nm, or any increment thereof. In other embodiments, a thickness of the halide perovskite nanosheets is characterized by the number of monolayers present in each nanosheet. For example, in some embodiments, the thickness of the halide perovskite nanosheets is in the range of about 1 monolayer to about 10 monolayers, about 2 monolayers to about 9 monolayers, about 3 monolayers to about 8 monolayers, about 4 monolayers to about 7 monolayers, about 4 to about 6 monolayers, about 5 monolayers to about 7 monolayers, or any increment thereof.

In some embodiments, the chemistry of the scintillation materials is modulated to tune nanosheet thicknesses and/or the distribution of nanosheet thicknesses. For example, in some embodiments, the molar ratio of Pb to Cs can be modulated to tune the distribution of nanosheet thicknesses. In some embodiments, the molar ratio of Pb/Cs ranges from about 100/1 to about 1/100, or any increment thereof. In some embodiments, the molar ratio of Pb/Cs is about 10/1. In some embodiments, the molar ratio of Pb/Cs is about 9/1. In some embodiments, the molar ratio of Pb/Cs is about 8/1. In some embodiments, the molar ratio of Pb/Cs is about 7/1. In some embodiments, the molar ratio of Pb/Cs is about 6/1. In some embodiments, the molar ratio of Pb/Cs is about 5/1. In some embodiments, the molar ratio of Pb/Cs is about 4/1. In some embodiments, the molar ratio of Pb/Cs is about 3/2. In some embodiments, the molar ratio of Pb/Cs is about 2/1.

In addition, in some embodiments, the thickness of the film is tunable. For example, in some embodiments, the thin film scintillation materials have a thickness in the range of about 0.01 μm to about 30 μm, or any increment thereof. In some embodiments, the thickness is in the range of about 5 μm to about 25 μm. For example, in some embodiments, the thickness is about 25 μm, about 24 μm, about 23 μm, about 22 μm, about 21 μm, about 20 μm, about 19 μm, about 18 μm, about 17 μm, about 16 μm, about 15 μm, about 14 μm, about 13 μm, about 12 μm, about 11 μm, about 10 μm, about 9 μm, about 8 μm, about 7 μm, about 6 μm, or about 5 μm.

As described above, in some embodiments, the solid scintillation materials are fabricated as large-area thin films. For example, in some embodiments, the area of the thin films is about 80 $cm^2$ or less. In some embodiments, the area of the thin films is about 75 $cm^2$ or less. In some embodiments, the area of the thin films is about 74 $cm^2$ or less. In some embodiments, the area of the thin films is about 73 $cm^2$ or less. In some embodiments, the area of the thin films is about 72 $cm^2$. In some embodiments, the area of the thin films is at least about 71 $cm^2$. In some embodiments, the area of the thin films is at least about 70 $cm^2$. In other embodiments, the area of the thin films is at least about 1 $cm^2$. For example, in some embodiments, the area of the thin films ranges from about 1 $cm^2$ to about 1 $m^2$.

In some embodiments, the solid scintillation materials, including those fabricated as thin films and/or as large-area thin films, are free or substantially free of defects. For example, in some embodiments, the solid scintillation materials are substantially free of surface defects. In some embodiments, the solid scintillation materials are free of surface defects. In some embodiments, the solid scintillation materials are substantially free of cracks. In some embodiments, the solid scintillation materials are free of cracks.

In some embodiments, the radioluminescence intensity increases with increasing thickness of the thin film in the range of about 5 μm to about 25 μm. For example, in some embodiments, the radioluminescence intensity plateaus at thicknesses greater than about 25 μm. Accordingly, in some embodiments, a thickness of the thin film is about 25 μm, about 24 µm, about 23 µm, about 22 µm, about 21 µm, about 20 µm, about 19 µm, about 18 µm, about 17 µm, about 16 µm, about 15 µm, about 14 µm, about 13 µm, about 12 µm, about 11 µm, about 10 µm, about 9 µm, about 8 µm, about 7 µm, about 6 µm, about 5 µm, or any increment thereof. In other embodiments, a thickness of the thin film is less than about 5 µm and/or greater than about 25 µm. For example, in some embodiments, a thickness of the thin film can range from about 1 µm to about 100 µm.

Embodiments of the present disclosure also describe methods of preparing solid scintillation materials, such as scintillation materials for X-ray detection. In some embodiments, the methods of preparing solid scintillation materials comprise depositing the colloidal scintillation materials of the present disclosure on a substrate to form any of the solid scintillation materials of the present disclosure. The depositing is not particularly limited. In some embodiments, the depositing includes dropcasting. In other embodiments, the depositing includes spin-coating, among other techniques for depositing.

Having discussed various forms of the scintillation materials, various applications involving the scintillation materials of the present disclosure are now presented.

Applications of the Scintillation Materials

Embodiments of the present disclosure further describe an X-ray detection system comprising any of the scintillation materials of the present disclosure and a detection device. The scintillation materials can absorb higher energy X-ray photons and convert the absorbed energy into lower energy photons with wavelength emissions in the visible region of the spectrum. The detection device can be used to absorb the visible photons emitted by the scintillation material.

In some embodiments, the X-ray detection system comprises a scintillation material deposited on a substrate in the form of a film (e.g., thin film), layer, or coating. The substrate is not particularly limited and thus can be selected from any substrate suitable for X-ray detection systems. For example, in some embodiments, the substrate is selected from glasses, plastics, ceramics, metals, crystalline semiconductors, amorphous semiconductors, and the like.

In some embodiments, the scintillation material that is deposited on the substrate is a dropcasted scintillation material. For example, in an embodiment, a colloidal scintillation material is dropcast on a substrate to form a dropcasted scintillation material. In other embodiments, the scintillation material is a spin-coated scintillation material. For example, in an embodiment, a colloidal scintillation material is spin-coated on a substrate to form a spin-coated scintillation material. These shall not be limiting as scintillation materials deposited using other techniques are within the scope of the present invention.

In some embodiments, the scintillation material comprises a halide perovskite superstructure. In some embodiments, the halide perovskite superstructure comprises stacked layers of halide perovskite nanosheets. In some embodiments, the halide perovskite superstructure comprises halide perovskite nanocubes. In some embodiments, the halide perovskite superstructure comprises halide perovskite nanoplatelets. In other embodiments, the halide perovskite superstructure comprises halide perovskite nanostructures other than halide perovskite nanosheets, nanocubes, and nanoplatelets.

In some embodiments, the halide perovskite superstructure can be characterized by the following chemical formula: $AMX_3$, wherein A is an inorganic or organic cation, M is a metal cation, and X is any halide. In certain embodiments, the halide perovskite superstructure has the formula: $CsPbX_3$, wherein X is any halide. For example, in some embodiments, X is selected from Cl, Br, and I.

In some embodiments, the wavelength emission of the scintillation material is tunable across the visible region of the spectrum by tailoring the halide species of the perovskite superstructure. For example, in some embodiments, a halide precursor species can be selected during fabrication to tune the wavelength emissions of the scintillation material. In some embodiments, the scintillation material can be subjected to an anion exchange reaction to tune the wavelength emission. In some embodiments, the scintillation material tunably emits visible photons with wavelengths in the range of about 380 nm to about 740 nm, or any increment thereof. For example, in certain embodiments, the scintillation material emits visible photons with wavelengths in the range of 410 nm to about 700 nm.

In some embodiments, the scintillation material exhibits a linear response to the X-ray dose rate in the rage of about 1 µGy/s to about 140 µGy/s, or any increment thereof. In some embodiments, the scintillation material exhibits a scintillation decay time in the range of about 0.1 ns to about 13 ns, or any increment thereof. In some embodiments, the scintillation material exhibits a spatial resolution of about 0.21 mm or less.

The detection device of the X-ray detection systems is not particularly limited and can include any device suitable for absorbing the visible photons emitted by the scintillation material. In some embodiments, the detection device is a photodiode. For example, in some embodiments, the detection device is a Si-based photodiode. In some embodiments, the detection device is a Group III nitride-based photodiode. In some embodiments, the detection device is a SiC-based photodiode. In some embodiments, the detection device is a photodetector. For example, in some embodiments, the detection device is an avalanche photodetector.

Figure 1:
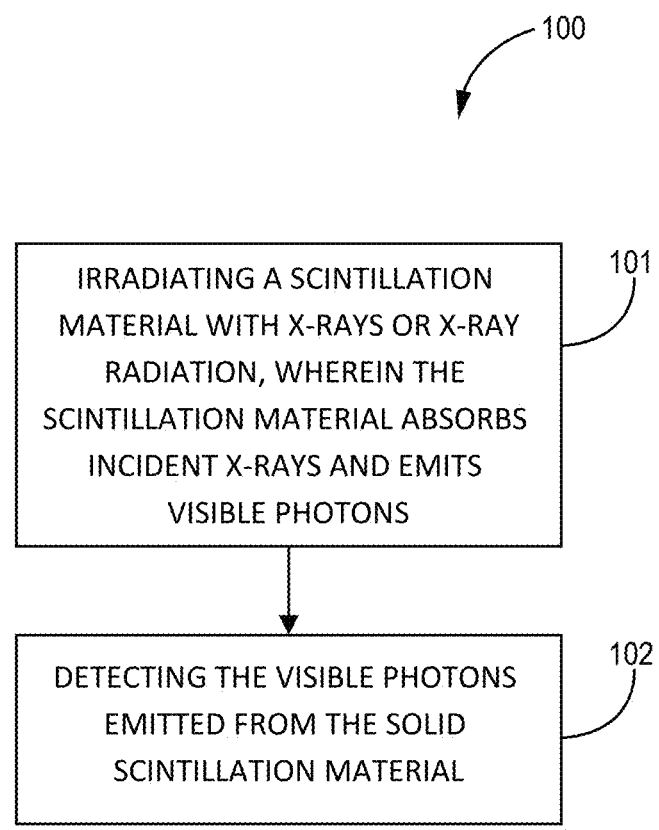
FIG. 1 is a flowchart of a method of detecting X-rays, according to one or more embodiments of the present disclosure.

FIG. 1 is a flowchart of a method of detecting X-rays, according to one or more embodiments of the present disclosure. As shown in FIG. 1, the method comprises irradiating 101 any of the solid scintillation materials of the present disclosure with X-rays or X-ray radiation, wherein the solid scintillation material absorbs incident X-rays and emits visible photons; and detecting 102 the visible photons emitted from the solid scintillation material.

Having discussed various applications involving the scintillation materials, methods of preparing the scintillation materials of the present disclosure are now presented.

Methods of Preparing Scintillation Materials

Figure 2:
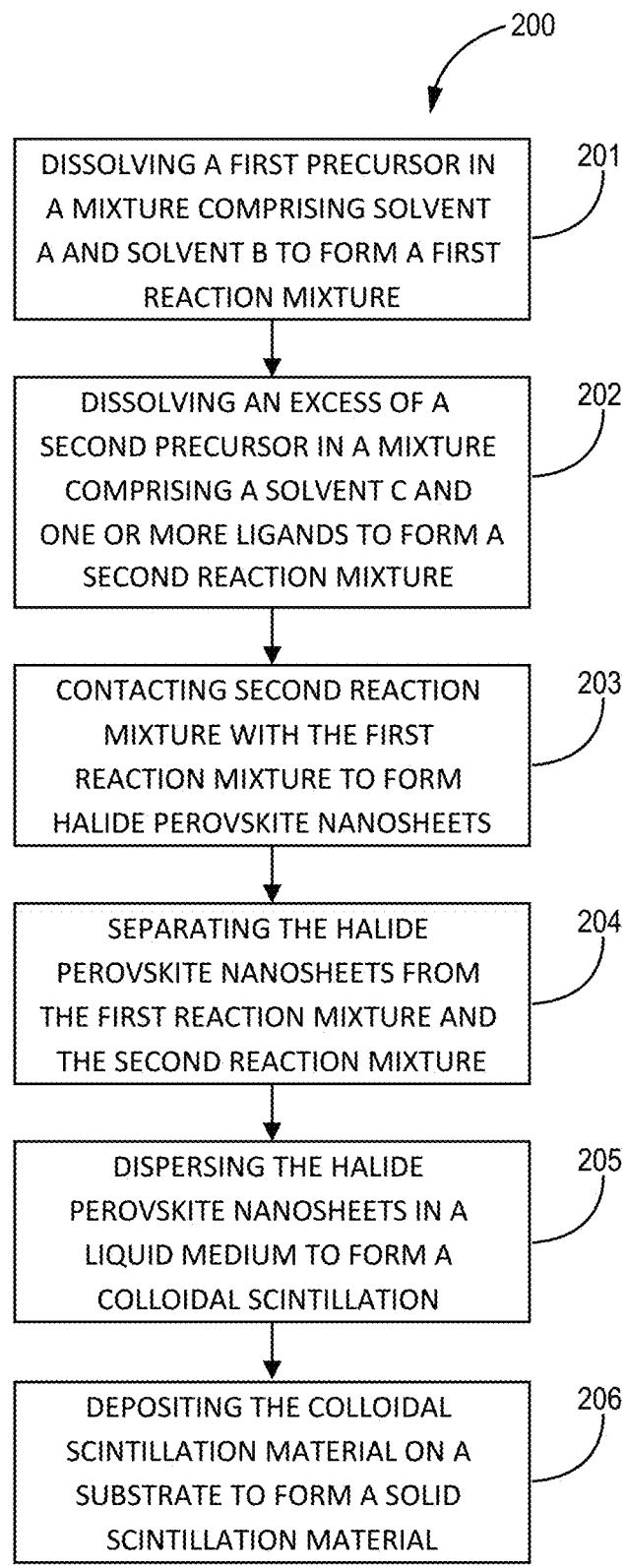
FIG. 2 is a flowchart of a method of preparing scintillation materials, according to one or more embodiments of the present disclosure.

FIG. 2 is a flowchart of a method of fabricating a scintillation material, according to one or more embodiments of the present disclosure. As shown in FIG. 2, the method can comprise one or more of the following steps: dissolving 201 a first precursor in a mixture comprising solvent A and solvent B to form a first reaction mixture; dissolving 202 an excess of a second precursor in a mixture comprising a solvent C and one or more ligands to form a second reaction mixture; contacting 203 the second reaction mixture with the first reaction mixture to form halide perovskite nanosheets; separating 204 the halide perovskite nanosheets from the first reaction mixture and the second reaction mixture; dispersing 205 the halide perovskite nanosheets in a liquid medium to form a colloidal scintillation material; and depositing 206 the colloidal scintillation material on a substrate to form a solid scintillation material.

In step 201, the first precursor is dissolved in a mixture comprising solvent A and solvent B to form the first reaction mixture. In some embodiments, the dissolving proceeds at about room temperature. In some embodiments, the dissolving proceeds at temperatures greater than or less than about room temperature. In some embodiments, the dissolving proceeds under stirring.

In some embodiments, the first precursor is an inorganic cation precursor or an organic cation precursor. For example, in some embodiments, the first precursor is selected from a Cs precursor, Rb precursor, MA precursor, FA precursor, and 5-annomiumvaleric acid precursor. In some embodiments, the first precursor is a Cs precursor, wherein the Cs precursor is selected from Cs acetate. In other embodiments, the first precursor is selected from any suitable precursor for Cs, Rb, MA, FA, and 5-ammonium valeric acid.

In some embodiments, the mixture comprises the solvent A and solvent B. In some embodiments, the solvent A and solvent B can be selected from polar solvents and non-polar solvents. For example, in some embodiments, the solvent A and solvent B are selected from propanol, hexane, toluene, dimethylsulfoxide (DMSO), N,N-dimethylformamide (DMF), gamma-butylolactone (GBR), dichloromethane (DCM), chloroform, acetonitrile, cyclohexane, and chloroform, among others. Other polar and/or non-polar solvents can be used herein without departing from the scope of the present disclosure.

In some embodiments, the mixture comprises a 1:2 ratio of the solvent A and solvent B. For example, in some embodiments, the mixture comprises a 1:2 volumetric ratio of the solvent A and solvent B. In other embodiments, the ratio or volumetric ratio of solvent A to B can range from 0:100 to about 100:0.

In step 202, an excess of the second precursor is dissolved in a mixture comprising a solvent C and one or more ligands to form the second reaction mixture. In some embodiments, the dissolving proceeds at a temperature greater than about room temperature. For example, in some embodiments, the dissolving proceeds at a temperature of about 20° C., about 30° C., about 40° C., about 50° C., about 60° C., about 70° C., about 80° C., about 90° C., about 100° C., about 110° C., about 120° C., about 130° C., about 140° C., or about 150° C., or any increment thereof. In certain embodiments, the dissolving proceeds at about 90° C. In other embodiments, the dissolving proceeds at temperatures less than about 40° C. and/or greater than about 150° C. In some embodiments, the dissolving proceeds under stirring. In some embodiments, the dissolving proceeds under vigorous stirring (e.g., relative to the stirring in step 201).

In some embodiments, the second precursor is a metal cation precursor. For example, in some embodiments, the second precursor is selected from a Pb precursor, Sn precursor, Cu precursor, Ni precursor, Co precursor, Fe precursor, Mn precursor, Pd precursor, Cd precursor, Ge precursor, and Eu precursor. In some embodiments, the second precursor is a metal halide precursor of the formula: $MX_n$, wherein M is a metal cation, X is any halide, and n depends on the valence of the metal cation. In some embodiments, M is selected from Pb, Sn, Cu, Ni, Co, Fe, Mn, Pd, Cd, Ge, and Eu. In some embodiments, X is selected from Cl, Br, and I. For example, in some embodiments, the second precursor is $PbBr_2$.

In some embodiments, the mixture comprises the solvent C and one or more ligands. In some embodiments, the solvent C can be selected from polar solvents and non-polar solvents. For example, in some embodiments, the solvent C is selected from propanol, hexane, toluene, dimethylsulfoxide (DMSO), N,N-dimethylformamide (DMF), gamma-butylolactone (GBR), dichloromethane (DCM), chloroform, acetonitrile, cyclohexane, and chloroform, among others. Other polar and/or non-polar solvents can be used herein without departing from the scope of the present disclosure.

In some embodiments, the organic ligands are selected from octylamine, octanoic acid, oleic acid, oleylamine, octadecene, octylphosphonic acid, trioctylphosphine, trioctylphosphine oxide, and combinations thereof. In some embodiments, the ligands are octylamine and octanoic acid.

In some embodiments, the mixture comprises a 1:1 ratio of solvent C to the one or more ligands. For example, in some embodiments, the mixture comprises two ligands and thus comprises a volumetric ratio of about 1:1:1 of solvent C to the first ligand to the second ligand. In other embodiments, the ratio or volumetric ratio of solvent C to the one or more ligands can range from 0:100 to about 100:0.

In step 203, the second reaction mixture is contacted with the first reaction mixture to form halide perovskite nanosheets, such as polydisperse halide perovskite nanosheets. In some embodiments, the contacting proceeds by injecting the second reaction mixture into the first reaction mixture. In other embodiments, the contacting includes injecting, adding, pouring, and mixing, among other techniques known in the art for contacting, which can be used without departing from the scope of the present disclosure. In some embodiments, the contacting proceeds by injecting a comparatively hot second reaction mixture into the first reaction mixture. For example, in some embodiments, the contacting proceeds by injecting the second reaction mixture into the first reaction mixture, wherein the second reaction mixture has a temperature of about 90° C. and the first reaction mixture is at about room temperature. In some embodiments, the contacting proceeds under stirring or vigorous stirring.

In some embodiments, the formation of halide perovskite nanosheets can be observed almost immediately, or in some instances, after longer durations. In some embodiments, the formation of the halide perovskite nanosheets is evident due to a color change (e.g., the solution turns green). In some embodiments, the reaction is completed within about 10 min, within about 5 min, within about 2 min, among other durations, which are not particularly limited. In some embodiments, the halide perovskite nanosheets are characterized by a non-uniform distribution of thicknesses. For example, in some embodiments, the halide perovskite nanosheets comprise thin halide perovskite nanosheets and/or thick halide perovskite nanosheets. In some embodiments, the halide perovskite nanosheets can be characterized as polydisperse.

In step 204, the halide perovskite nanosheets are separated from the first reaction mixture and the second reaction mixture. In some embodiments, the separating includes centrifuging the reaction mixture comprising the first reaction mixture, second reaction mixture, and halide perovskite nanosheets to separate the halide perovskite nanosheets from the first reaction mixture and the second reaction mixture. In other embodiments, techniques known in the art other than centrifuging may be used to achieve the separating.

In step 205, the halide perovskite nanosheets are dispersed in a liquid medium to form a colloidal scintillation material. In some embodiments, the dispersing can proceed by sonicating, agitating, mixing, stirring, among other techniques known in the art for dispersing. In some embodiments, the liquid medium is selected from polar and/or non-polar solvents. For example, in some embodiments, the liquid medium is selected from toluene, dimethylsulfoxide (DMSO), N,N-dimethylformamide (DMF), gamma-butylolactone (GBR), dichloromethane (DCM), chloroform, acetonitrile, cyclohexane, propanol, hexane, and chloroform, among others.

In some embodiments, the colloidal scintillation materials comprise a high concentration of halide perovskite nanosheets dispersed in the liquid medium. For example, in some embodiments, the concentration of halide perovskite nanosheets is about 500 mg/mL. In some embodiments, the concentration of halide perovskite nanosheets is about 400 mg/mL. In some embodiments, the concentration of halide perovskite nanosheets is about 300 mg/mL. In some embodiments, the concentration of halide perovskite nanosheets is about 200 mg/mL. In some embodiments, the concentration of halide perovskite nanosheets is about 150 mg/mL. In some embodiments, the concentration of halide perovskite nanosheets is about 100 mg/mL. In some embodiments, the concentration of halide perovskite nanosheets is about 50 mg/mL. In some embodiments, the concentration of halide perovskite nanosheets is about 1 mg/mL or greater.

In step 206, the colloidal scintillation material is deposited on a substrate to form solid scintillation material. In some embodiments, the depositing is performed by drop-casting and not spin-coating. In other embodiments, the depositing can be performed by casting, coating, layering, providing, pouring, among other techniques known in the art for depositing, which are not particularly limited and can be used without departing from the scope of the present disclosure. The substrate is not particularly limited. For example, in some embodiments, the substrate is selected from glasses, plastics, ceramics, metals, crystalline semiconductors, and amorphous semiconductors, among others. In some embodiments, the solid scintillation material comprises a halide perovskite superstructure, wherein the halide perovskite superstructure comprises stacked layers of halide perovskite nanosheets. In other embodiments, any of the solid scintillation materials of the present disclosure may be used herein.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example

The following Example describes the room-temperature synthesis of a high quality scintillator in both colloidal and solid film forms, designed and self-assembled from highly concentrated solutions of perovskite nanosheets. The colloidal form of highly concentrated $CsPbBr_3$ nanosheets (e.g., up to 150 mg/mL) exhibited equivalent brightness of radioluminescence to the film counterpart and showed long-term stability under both storage and X-ray exposure conditions. The $CsPbBr_3$ colloid exhibited a higher light yield (~21000 photons/MeV) than the commercially available Ce:LuAG single-crystal scintillator (~18000 photons/MeV). Scintillators based on these nanosheets displayed both strong radioluminescence and long-term stability under X-ray illumination. Due to their high concentration and nanosheet morphology, these novel halide perovskite-based scintillators were readily solution-processable and assemble into a uniform crack-free large-area films (e.g., 72 $cm^2$) with the requisite thickness for high-resolution (<0.21 mm) X-ray imaging applications. Prototype applications of these high-quality scintillating films included X-ray imaging screens for a cellphone panel and a standard central processing unit (CPU) chip. The radiography prototype combined large-area processability with high resolution and a strong penetration ability to sheath materials, such as resin and silicon. Finally, time-resolved photoluminescence spectroscopy was used to reveal an energy transfer process inside those stacked nanosheet solids that enhanced the scintillation performance beyond what is typically expected in nanocrystal scintillators. These findings demonstrated a large-area solution-processed scintillator of stable and efficient radioluminescence, paving the way for low-cost radiography and X-ray imaging devices.

Materials and Methods

Materials

All reagents were used without any purification: Lead(II) bromide ($PbBr_2$, 99.999% trace metals basis), Caesium acetate (CsAc, 99.99% trace metals basis), Octylamine (OcAm, 99%), Octanoic acid (OcAc, 98%), 1-propanol (PrOH) and n-Hexane (Hex, 99%) and Toluene (TOL, 99.8%) were purchased from Sigma-Aldrich. All chemicals were used without any further purification.

Synthesis of $CsPbBr_3$ Nanosheets

In a typical example, Cs precursor and PbBr2 precursor were prepared separately, and the reaction was initiated by injecting the latter into the former. Firstly, Cs precursor solution was prepared by dissolving 32 mg CsAc in 1-mL 1-PrOH in a 20-mL vial under stirring in air at room temperature, followed by addition of 6-mL Hex and 2-mL 1-PrOH. Secondly, PbBr2 precursor solution was prepared by dissolving 245-mg PbBr2 into a mixture solution of 0.45-mL 1-PrOH, 0.45-mL OcAc and 0.45-mL OcAm at 90° C. in air under vigorous stirring. Thirdly, the hot PbBr2 precursor was injected into Cs precursor swiftly under vigorous stirring at room temperature. The system turned green immediately, and the reaction completed in 2 minutes. The CsPbBr3 NCs were isolated by centrifugation at 4000 rpm, and the pellet was dispersed into 2-mL toluene. The synthesis was successfully scaled up by 20 times, producing ~3 grams of CsPbBr3 nanosheets in one single trial.

Photoluminescence and Absorption

The as-prepared nanocrystals were diluted about 100 times in n-hexane for steady-state measurements of photoluminescence and absorption, respectively. A Cary 5000 UV-vis spectrometer (Agilent Technologies) was used for absorption measurements in the range from 450 nm to 700 nm. A FluoroMax-4 spectrofluorometer (Horiba Scientific; a slit width of 2 nm and a scan rate of 500 nm/min) was used to record the photoluminescence spectra. The excitation wavelength used for the $CsPbBr_3$ nanocrystals were set at 400 nm.

Radioluminescence and X-Ray Imaging

Radioluminescence were obtained by an Edinburgh FS5 fluorescence spectrophotometer (Edinburgh Instruments Ltd., UK) equipped with a miniature X-ray source (AMPEK, Inc.). The photographs of X-ray-excited luminescence were acquired with a digital camera (Canon 600D with EF-S 35 mm f/2.8 IS STM lens).

Transmission Electron Microscopy

TEM images were acquired using a Tecnai transmission electron microscope with an acceleration voltage of 120 keV. HRTEM images were acquired using the same instrument. Low-dose HRTEM images were acquired by a Gatan K2 direct-detection camera operated in electron-counting mode (camera counting frame rate of 400 fps (frames per second) at 4 k×4 k resolution) with a final image output rate of 40 fps at 4 k×4 k resolution. An exposure of 3 s therefore resulted in an image stack of 120 individual image frames. These frames were summed to improve the signal-to-noise ratio (SNR).

X-Ray Diffraction Measurements

Powder X-ray diffraction was performed using a Bruker AXS D8 diffractometer with Cu-Ka radiation (λ=1.5406 Å). The samples were prepared via the drop casting of the nanocrystal suspension onto a clean glass slide, followed by drying at room temperature.

Time-Resolved Photoluminescence (TRPL) Measurement

Time-resolved photoluminescence (TRPL) spectra were collected using a high-resolution streak camera (Hamamatsu C10910) where the pump beam was generated with the second harmonic (410 nm) of a Spectra-Physics MaiTai eHP and Inspire HF-100 OPO. APE Pulse Select pulse picker was used to select the repetition rate of the pulse beam to 4 MHz. Measurements were performed at room temperature with the excitation fluence of 0.1 nJ/cm$^2$.

Atomic Force Microscopic Imaging

AFM image was acquired on a Bruker AFM (Model: Dimension Icon with ScanAsyst) operated in a regular tapping mode.

Light Yield Measurement

Light Yield were performed by using photomultiplier tube (PMT GDB 44F). The CsPbBr$_3$ sample in liquid state was put into a glass bottle with dimensions of dia. 20 mm×20 mm, and the bottom side of the glass bottle was coupled by the PMT using silicone grease. The sample was excited by γ rays with energy of 662 keV ($^{137}$Cs source). The signal was fed into a shaping amplifier (ORTEC 572A), a multichannel analyzer (MCA) (ORTEC 926), and finally to a personal computer. The shaping time was set as 2 μs. To calculate the Light Yield of CsPbBr$_3$ sample, a Ce:LuAG single crystal cut into 5 mm cube was used as a standard sample, whose Light Yield was 18,000 ph./MeV±1,500 ph./MeV. The Ce:LuAG sample was also tested by using the same method as CsPbBr$_3$. Because these two kinds of samples have similar emission spectra, the Light Yield of CsPbBr$_3$ was evaluated by the ratio of Channel Number corresponding to their full energy peaks.

Discussion

Figure 3:
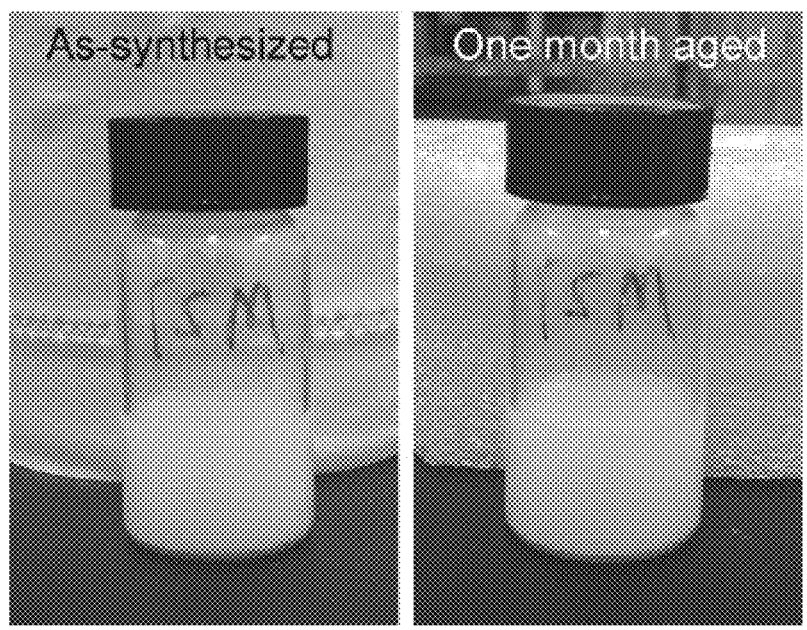
FIG. 3 are images of a long-term storage test of colloidal comprising CsPbBr3 nanosheets (Pb/Cs: 5:1), showing an enhanced stability, according to one or more embodiments of the present disclosure.

The CsPbBr$_3$ nanosheets were synthesized using a modified coprecipitation method. Briefly, an excessive amount of PbBr$_2$ precursor was injected into a cesium acetate precursor at room temperature under an ambient atmosphere. A bright green color appeared immediately, indicating the formation of CsPbBr$_3$ nanosheets. Conventionally, the purification process of CsPbBr$_3$ nanocrystals requires breaking the colloidal stability by the addition of a poor solvent, ethyl acetate for example, which inevitably induces severe degradation of the particles. In this work, however, the nanosheets were easily collected by low-speed centrifugation (<4000 rpm) without using any polar solvents. The collected nanosheets were dispersed in toluene with a high concentration of up to 150 mg/mL, and the resulting colloid could be kept in a capped vial for one month without any noticeable degradation (FIG. 3).

Figure 4A:
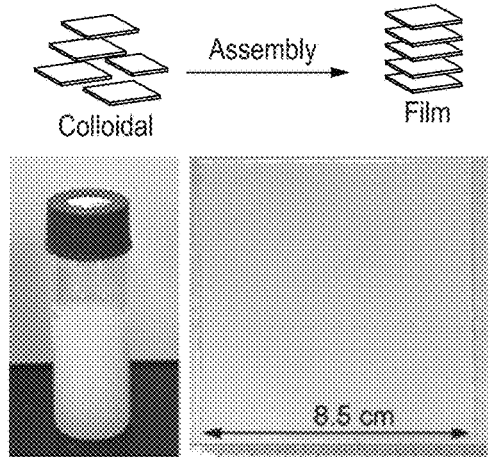
Figure 4D:
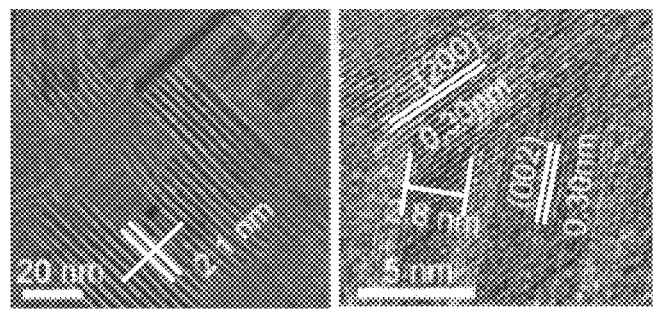
Figure 4D:
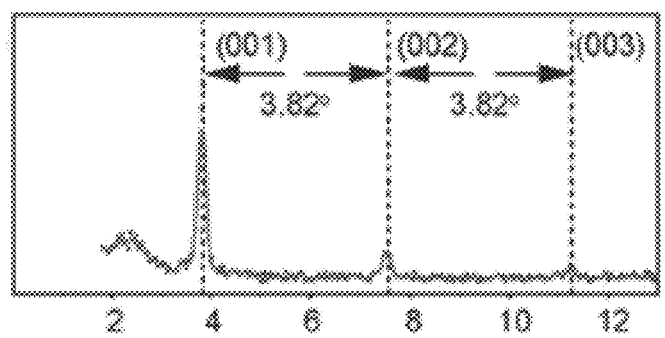
Figure 4E:
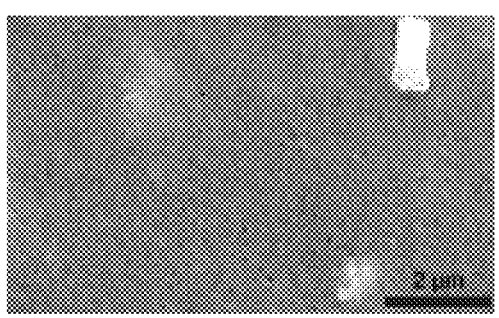
Figure 4F:
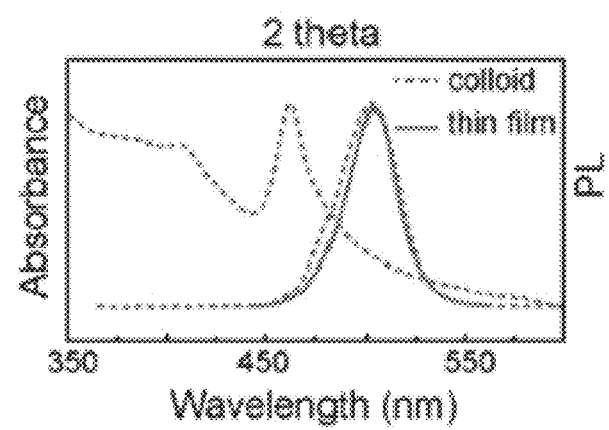
Figure 5:
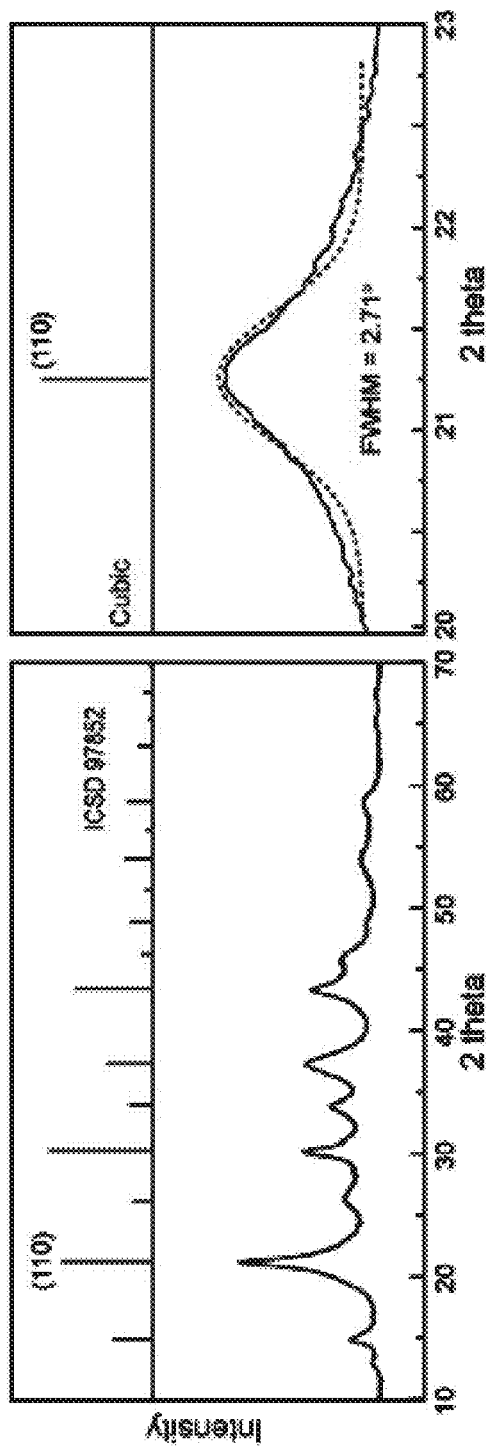
FIG. 5 are graphical views of the XRD pattern of $CsPbBr_3$ nanosheets, which shows a significantly broadened peak, according to one or more embodiments of the present disclosure. The mean thickness of the nanosheets can be calculated according to Scherrer equation.

The large-area thin film was fabricated through a self-assembly process of CsPbBr$_3$ nanosheets. See generally FIGS. 4A-4F. Typically, the concentrated colloid was drop cast on a clean glass substrate under ambient conditions and allowed to dry naturally. A crack-free perovskite thin film was obtained in 12 minutes, showing a green tint under ambient light (FIG. 4A). The TEM image revealed the face-to-face packing manner of CsPbBr$_3$ nanosheets with an interplane gap of 2.1 nm (FIG. 4B). Moreover, the HRTEM image showed the lattice fringes of both a lateral nanosheet and an aligned nanosheet, featuring a (002) d-spacing of 0.30 nm (FIG. 4C). Importantly, both the thickness of the nanosheets (2.8~4.2 nm) and the gap between them (2.1 nm) were able to be accurately measured. Considering the lattice constant (0.59 nm) of a single unit cell, the number of monolayers (5-7 layers) comprising an individual nanosheet was able to be determined, which was in good agreement with both the HRTEM observation and the Scherrer broadening effect (FIG. 5). The thin film was rather flat, featuring a surface roughness of approximately 13 nm and a thickness of approximately 4.0 μm (FIG. 4E, FIGS. 6A-6B), which is critical for high-resolution radiography.

To further confirm the self-assembly nature of the thin film, low-angle powder XRD was conducted. The XRD pattern showed three peaks with an equal spacing of 3.82°, indicating that the slit of the superstructure was approximately 2.3 nm. This value was in line with the result obtained from HRTEM (2.1 nm), suggesting that there were two layers of passivating ligands (octylamine or octanoic acid) occluding the gap. It is worth noting that the result was in good agreement with the value obtained from the reported relationship d (Å)=8.06+1.59×n, where n is the number of carbon atoms in the alkylamine (for octylamine or octanoic acid, n=8). The thin film showed intense luminescence centered at 515 nm under 365-nm excitation, which was slightly spectrally redshifted compared to that of the colloidal counterpart. Interestingly, the absorption of the colloid exhibited an excitonic peak at 460 nm, together with a long tail extending to 570 nm (FIG. 4F). This broadening was ascribed to the inhomogeneous distribution of the nanosheet thickness, as evidenced by HRTEM.

The coexistence of both thin and thick CsPbBr$_3$ nanosheets, as indicated by HRTEM, implied an energy transfer process inside the stacked thin film. To quantitatively evaluate the energy transfer efficiency, a streak-camera system as used to collect the transient PL signal in both wavelength and time domains (FIG. 7A). The time-delayed PL profile showed a clear redshift from 460 nm to 510 nm, indicating that the exciton recombination center shifted from a high energy level to a low one in 15 ns (FIG. 7B). The PL decay trace at 500 nm showed a nearly monoexponential decay with a lifetime of 8.09 ns (FIG. 7C). In stark contrast, the PL decay trace at 460 nm comprised both a short component of 0.67 ns (67%) and a long component of 2.57 ns (33%) (FIGS. 7E-7F). The long component was likely the intrinsic excited-state lifetime of the thin nanosheets (donor), which were isolated from the thick ones (acceptor), with a lifetime value similar to that of five-layer nanoplatelets. On the other hand, the short component was attributed to the energy transfer from the thin to the thick nanosheets.

To validate the assumption that the short-component lifetime of 460-nm emission was due to FRET, the rising time of 500-nm emission (FIG. 7E) was fitted. Indeed, the rise time of 0.58 ns at 500 nm (acceptor) was quite similar to the short component of 0.67 ns at 460 nm (donor), confirming the abovementioned assumption about FRET. It is worth noting that the effective lifetime was wavelength dependent with two plateaus, suggesting the existence of both thin and thick nanosheets (FIG. 7D). Then, the assembly could be viewed as a donor-acceptor system where the donor has an intrinsic lifetime of 2.57 ns ($\tau_d$), and the donor-acceptor assembly has a lifetime of 0.67 ns ($\tau_{da}$). The FRET efficiency (E) was calculated by the following equation:

$$E = 1 - \frac{\tau_{da}}{\tau_d} = 74\% \qquad (1)$$

In the thin film of the stacked nanosheet assembly, the donor-acceptor distance (r) was equivalent to the interplane distance, approximately 2.3 nm, as indicated by the small-angle XRD measurement. By using equation (2), the Förster distance ($R_0$) of $CsPbBr_3$ nanosheets was calculated to be 2.74 nm. To the best of Applicant's knowledge, this is the first report for the accurate measurement of the Förster distance between perovskite quantum dots.

$$E = \frac{1}{1 + (r/R_0)^6} \qquad (2)$$

Figure 8A:
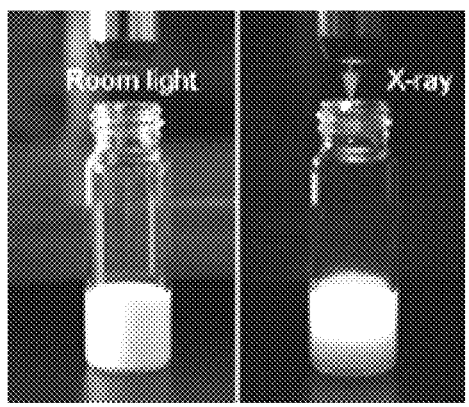

Next, the radioluminescence of both colloidal and solid forms of CsPbBr3 nanosheets and the transformation process were investigated. See generally FIGS. 8A-8F. As shown in FIG. 8A, the concentrated colloid showed bright green luminescence under X-ray excitation. It was remarkable that the ensuing thin film also exhibited intense green radioluminescence (FIG. 9B). In fact, most perovskite nanocrystals tend to compromise on PLQY after colloid-solid transformation due to ligand-detachment induced trap states. For example, due to the ligand loss, the $CsPbBr_3$ tethered with oleic-acid ligands dramatically drops its original PLQY from 56 to 18% after solidification. The stacked nanosheets in this work, however, retained a high PLQY of up to 63%, mainly because the ligands tethered on nanosheets were well shielded among the assembly.

Figure 8B:
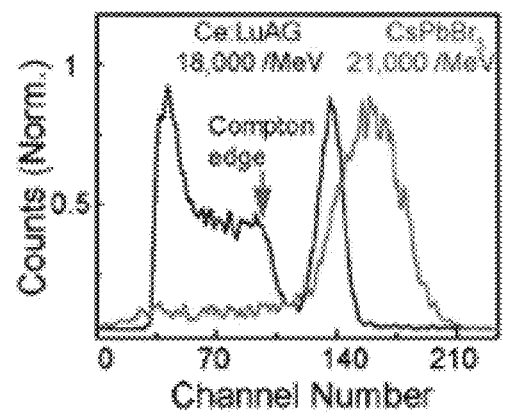
Figure 8C:
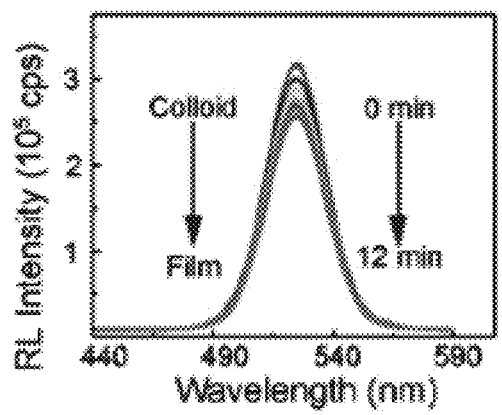

In an attempt to quantify the RL light yield, a commercially available scintillator of cerium-doped lutetium-aluminum garnet (Ce:LuAG) single crystal was used as a reference standard, and exhibited a similar RL peak to colloidal $CsPbBr_3$ nanosheets, both centered at 520 nm (FIG. 10). Both samples were excited by γ-rays with an energy of 662 keV ($^{137}Cs$ source). The signal was fed into a multichannel analyzer (MCA) (ORTEC 926) and plotted into a pulse height spectrum (FIG. 8B). Therefore, the channel number at the full energy peak represented the relative light yield of the scintillator. Remarkably, the $CsPbBr_3$ colloid exhibited a higher light yield (~21000 photons/MeV) than the commercially available Ce:LuAG single-crystal scintillator (~18000 photons/MeV). In stark contrast to most of the conventional scintillators, the colloidal scintillator did not show any pronounced Compton edge.

Figure 8D:
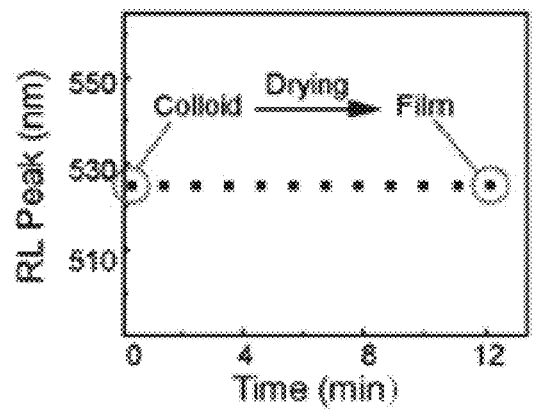
Figure 8E:
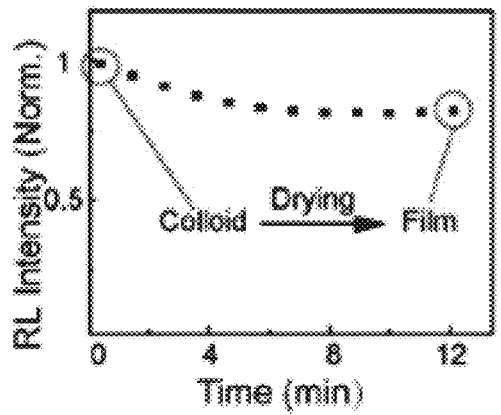
Figure 8F:
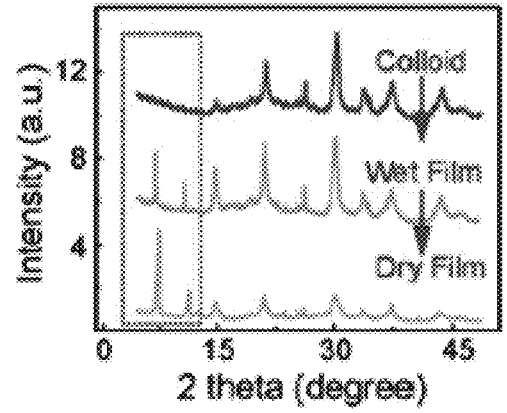

To monitor the RL change during self-assembly in real time, a fiber coupled spectrometer was used to record the RL of $CsPbBr_3$ nanosheets during the transition from a colloid to a solid. As seen, the RL peak remained the same at 525 nm during the drying process (FIG. 8D). Surprisingly, the RL of the colloidal scintillator was 20% higher than that of its solid form. The slight decrease in thin-film RL intensity was ascribable to the enhanced reabsorption between thin and thick nanosheets as the self-assembly proceeds. To elucidate the self-assembly process, a real-time XRD measurement was conducted (FIG. 8F). As the colloid solidified, the peaks at 7.6° and 11.4° emerged and intensified as the time evolved, confirming the formation of a highly ordered superstructure. It was also observed that the XRD peaks are significantly broadened due to the reduced grain size (FIG. 5). Based on the Scherrer equation, the mean thickness of the nanosheets was calculated to be 2.95 nm, which was in good agreement with the HRTEM result.

X-ray radiography is an imaging technique that uses the dose-dependence of scintillator radioluminescence to generate a phase contrast image. To assess the dose response of the perovskite film, the radioluminescence of a film (25 μm in thickness) was recorded under varied X-ray dose rates. See generally FIGS. 9A-9H. The RL intensity showed an exceptional linearity to the dose rate in a broad range of 1 to 140 μGy/s (FIG. 9A and FIG. 11). Importantly, the RL intensity increased with increasing thickness of the film in the range of 5-25 μm (FIG. 9B). The intensity reached a plateau when the thickness was above 25 μm, suggesting an optimal thickness of the active layer for the perovskite scintillator screen. This value was significantly smaller than those previously reported values, indicating the strong X-ray stopping power of the thin film. Remarkably, the perovskite film under investigation showed no radio-degradation effect under continuous X-ray irradiation for 2 hours (FIG. 9C), exhibiting a long-term radio-stability. On a separate note, the lifetime of the perovskite scintillator was wavelength-dependent, ranging from 2 to 13 ns with varied wavelengths from 460 to 550 nm (FIG. 7D). This was two orders of magnitude shorter than that of the conventional standard scintillator (NaI:Tl, decay time ~200 ns), which allowed for significantly shortened deadtime for radio detection devices. Holding these features, the perovskite thin film of stacked $CsPbBr_3$ nanosheets qualified for a potential candidate for radiography applications.

As a proof-of-concept experiment, an X-ray imaging system was constructed with a projection configuration (FIG. 12). By using a commercial camera and a 50-keV X-ray source, the prototype X-ray imager revealed the detailed structural information of a transistor panel under a resin cover (FIG. 9E). To measure the resolution ability of the prototype, the point spread function of the intensity profile (red arrow in FIG. 9E) was fitted with a Gaussian function. Impressively, such a simple prototype was able to provide a spatial resolution as high as 0.21 mm (FIG. 9F), mainly due to the crack-free virtue of the thin film. Apart from organic masks (i.e., resin), inorganic materials such as a silicon chip (~300 μm in thickness, FIG. 13) could also be penetrated by X-rays without compromising any resolution ability (FIG. 9G-9H).

In conclusion, this work presented the room-temperature synthesis for a $CsPbBr_3$ nanosheet colloid on the gram-scale. The concentrated colloid showed strong luminescence under both X-ray and UV light illumination. Remarkably, the colloid was readily cast into a crack-free thin film of a large area up to 72 cm². The thin film consisting of self-assembled perovskite nanosheets not only exhibited a high PLQY, but also showed long-term stability under continuous X-ray irradiation. The ensuing radiography prototype demonstrated a high-quality imaging ability with resolution down to 0.21 mm. These findings offer a colloidal scintillator to the screen industry, opening many avenues to low-dose radiography or even liquid scintillating displays.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An X-ray detection system, comprising:
   a nanocrystal scintillation material for absorbing X-rays and emitting visible photons, wherein the nanocrystal scintillation material comprises a plurality of halide perovskite nanosheets, and the nanocrystal scintillation material is deposited on a substrate as a thin film halide perovskite superstructure; and
   a detection device for absorbing the visible photons emitted by the scintillation material,
   wherein the scintillation material has a photoluminescence quantum yield (PLQY) of about 60% or more and exhibits a spatial resolution of about 0.21 mm or less.

2. The system of claim 1, wherein the plurality of halide perovskite nanosheets self-assemble into stacked layers of halide perovskite nanosheets.

3. The system of claim 1, wherein the stacked layers of halide perovskite nanosheets comprise a non-uniform distribution of nanosheet thicknesses.

4. The system of claim 1, wherein the stacked layers of halide perovskite nanosheets comprise thin and thick halide perovskite nanosheets.

5. The system of claim 1, wherein an energy transfer between the thin and thick halide perovskite nanosheets within the stacked layers of halide perovskite nanosheets increases an efficiency and sensitivity of the scintillation material for X-ray detection.

6. The system of claim 1, wherein the halide perovskite nanosheets have the formula: $AMX_3$, wherein A is an inorganic or organic cation, M is a metal cation, and X is a halide.

7. The system of claim 1, wherein the halide perovskite nanosheets have the formula: $CsPbX_3$, wherein X is Cl, Br, or I.

8. The system of claim 1, wherein the scintillation material is a crack-free thin film having an area of about 80 $cm^2$ or less.

9. The system of claim 1, wherein the wavelength of the visible photons emitted is tunable within the range of about 410 nm to about 700 nm.

10. The system of claim 1, wherein the halide perovskite nanosheets have the formula: $CsPbX_3$, wherein X is Cl, Br, or I.

11. An X-ray detection system comprising:
    a scintillation material for absorbing X-rays and emitting visible photons, the scintillation material comprising:
       a substrate; and
       a thin film halide perovskite superstructure deposited on the substrate, the perovskite superstructure comprising a plurality of halide perovskite nanosheets that self-assemble into stacked layers, the scintillation material having a photoluminescence quantum yield (PLQY) of about 60% or more; and
    a detection device for absorbing the visible photons emitted by the scintillation material.

12. The system of claim 11, wherein the scintillation material exhibits a spatial resolution of about 0.21 mm or less.

13. The system of claim 11, wherein the detection device is a photodiode.

14. The system of claim 11, wherein the detection device is photodetector.

15. The system of claim 11, wherein the stacked layers of the halide perovskite nanosheets comprise nanosheets having a non-uniform distribution of nanosheet thicknesses.

16. The system of claim 15, wherein a nanosheet thickness among the halide perovskite nanosheets ranges between about 1 nm and about 5 nm.

17. The system of claim 16, wherein the nanosheet thickness ranges between about 2 nm and about 4.5 nm.

18. The system of claim 11, wherein the halide perovskite nanosheets have the formula: $AMX_3$, wherein A is an inorganic or organic cation, M is a metal cation, and X is a halide.

* * * * *